(12) United States Patent
Crank et al.

(10) Patent No.: US 9,003,023 B2
(45) Date of Patent: Apr. 7, 2015

(54) SYSTEMS AND METHODS FOR INTERACTIVE ANALYTICS OF INTERNET TRAFFIC

(75) Inventors: Samuel John Crank, Canton, GA (US); Upasona Kath Hazarika, Santa Clara, CA (US)

(73) Assignee: Zscaler, Inc., San Jose, CA (US)

( * ) Notice: Subject to any disclaimer, the term of this patent is extended or adjusted under 35 U.S.C. 154(b) by 349 days.

(21) Appl. No.: 13/495,537

(22) Filed: Jun. 13, 2012

(65) Prior Publication Data
US 2013/0339514 A1 Dec. 19, 2013

(51) Int. Cl.
*H04L 29/06* (2006.01)

(52) U.S. Cl.
CPC ................... *H04L 63/1408* (2013.01)

(58) Field of Classification Search
CPC ... H04L 5/18; H04L 12/1453; H04L 12/2418; H04L 12/2621; H04L 12/2626; H04L 12/2634; H04L 12/2694; H04L 29/06557; H04L 29/06877; H04L 29/06897; H04L 29/08099; H04L 41/0859; H04L 41/14; H04L 43/00; H04L 63/1408; H04L 12/2602; H04L 12/5855; H04L 12/5895; H04L 41/046; H04L 41/069; H04L 41/0893; H04L 41/12; H04L 41/22; H04L 41/5012; H04L 43/045; H04L 43/06; H04L 43/062; H04L 43/067; H04L 43/10

USPC ......................................................... 709/224
See application file for complete search history.

(56) References Cited

U.S. PATENT DOCUMENTS

| | | | |
|---|---|---|---|
| 6,502,131 B1 * | 12/2002 | Vaid et al. ...................... | 709/224 |
| 2007/0208803 A1 * | 9/2007 | Levi et al. ...................... | 709/203 |
| 2008/0275744 A1 | 11/2008 | MacIntyre et al. | |
| 2009/0119280 A1 * | 5/2009 | Waters et al. ...................... | 707/5 |
| 2010/0125903 A1 | 5/2010 | Devarajan et al. | |
| 2010/0194778 A1 | 8/2010 | Robertson et al. | |
| 2010/0251128 A1 | 9/2010 | Cordasco | |
| 2011/0010173 A1 | 1/2011 | Scott et al. | |
| 2011/0167474 A1 | 7/2011 | Sinha et al. | |
| 2011/0187711 A1 | 8/2011 | Giovinazzi et al. | |
| 2012/0005359 A1 * | 1/2012 | Seago et al. .................. | 709/230 |

\* cited by examiner

*Primary Examiner* — Kevin Bates
*Assistant Examiner* — Ronak Patel
(74) *Attorney, Agent, or Firm* — Clements Bernard PLLC; Lawrence A. Baratta, Jr.; Christopher L. Bernard

(57) ABSTRACT

A computer implemented method, a cloud system, and a log system provide interactive analytics providing various intuitive mechanisms for interaction with data visualizations of Internet traffic, email, etc. The methods and systems utilize a cloud based monitoring system where all traffic from an organization may be monitored in a location and platform independent manner. The methods and systems include context-aware drilldown with progressively applied filtering and grouping while maintaining workflow history such that a user can go back to any point in the flow and proceed down a new path of investigation.

14 Claims, 21 Drawing Sheets

SYSTEMS AND METHODS FOR INTERACTIVE ANALYTICS OF INTERNET TRAFFIC

FIELD OF THE INVENTION

Generally, the field of art of the present disclosure pertains to computer and network systems and methods, and more particularly, to systems and methods for interactive analytics of Internet traffic such as web browsing statistics, email, and the like for providing various intuitive mechanisms for interaction with data visualizations.

BACKGROUND OF THE INVENTION

Enterprises with computer networks have a need to monitor network usage for a variety of reasons including policy compliance, reporting, threat detection, determining efficiencies, and the like. Various conventional systems and methods exist for computer security, analytics, monitoring, etc. Varying degrees of analytics functionality exist in conventional systems and methods but these do not offer a comprehensive workflow that ranges from investigating a trend to taking an action for remediation. For example, one conventional system and method enable administrators to drill down from a high level report based on a grouping and then pivot on the given data. An administrator may view data grouped by Risk Class and then have the ability to view data grouped by domains for a given Risk Class. While this drilldown capability provides interesting data, there is no workflow and the administrator's drilldown activity is not tracked. As a result, the administrator is not able to report back on the various steps of the investigation. With the emergence of the cloud and use of the cloud for security, monitoring, etc., there is a need to provide functionality of systems and methods for interactive analysis of Internet traffic with cloud-based services.

BRIEF SUMMARY OF THE INVENTION

In an exemplary embodiment, a computer implemented interactive analytics method includes logging data traffic between a plurality of users and an external network in a log system, wherein the logging is performed by a cloud based system; receiving a first request for interactive analytics of the logged data traffic, wherein the first request includes a date range, a visualization type, and a grouping; obtaining data traffic from the log system responsive to the first request; formatting the obtained data traffic based on the date range, the visualization type, and the grouping to provide a first interaction based on the first request; displaying the first interaction; and storing the first interaction in a history list.

In another exemplary embodiment, a cloud system for interactive analytics includes a plurality of servers forming a cloud system communicatively coupled to an external network and a plurality of users; and a log server communicatively coupled to the plurality of servers; wherein each of the plurality of servers include computer executable instructions, and, in response to execution, the computer executable instructions cause each of the plurality of servers to: monitor data traffic between each of the plurality of users and the external network; analyze the monitored data traffic; and log the analyzed data traffic to the log server in a compressed format; wherein the log server includes computer executable instructions, and, in response to execution, the computer executable instructions cause the log server to: present an interactive analytics tool to a user; receive requests via the interactive analytics tool for visualization of data in the log server; and maintain a workflow history in the interactive analytics tool for context-aware drilldown and progressively applying filters.

In yet another exemplary embodiment, a log system for interactive analytics includes a network interface communicatively coupled to a cloud based system, wherein the cloud system is configured to monitor each of a plurality of users independent of location, device type, and operating system of each of the plurality of users; a processor; and memory storing computer executable instructions, and in response to execution by the processor, the computer executable instructions cause the processing node to: receive monitored data from the cloud based system, wherein the monitored data includes all data traffic between a plurality of users and an external network; compress the monitored data; store the monitored data in a log file; receive a request for interactive analytics; obtain data from the log file based on the request; and maintain a workflow history of all requests for interactive analytics.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, the present disclosure relates to systems and methods for interactive analytics of Internet traffic such as web browsing statistics and the like for providing various intuitive mechanisms for interaction with data visualizations. The interactive analytics systems and methods can be implemented through a cloud-based system. The interactive analytics systems and methods can include an analytics tool that provides a visual interface for interactive analysis of Internet traffic. Advantageously, the analytics tool enables visual exploration of data by providing various intuitive mechanisms for interaction with data visualizations. The Analytics tool supports interaction with data through various mechanism such as direct selection of visualization type, filters and grouping; context-aware drilldown, progressively applying filters and changing the grouping; history of steps taken, making it possible to go back to any point in the flow and proceed down a new path of investigation; and the like. The Analytics tool also provides several contexts in which to review the data: view the visualizations in real time during analysis, play back the analysis session multiple times, export the session to a file for offline review, and the like.

Figure 1:
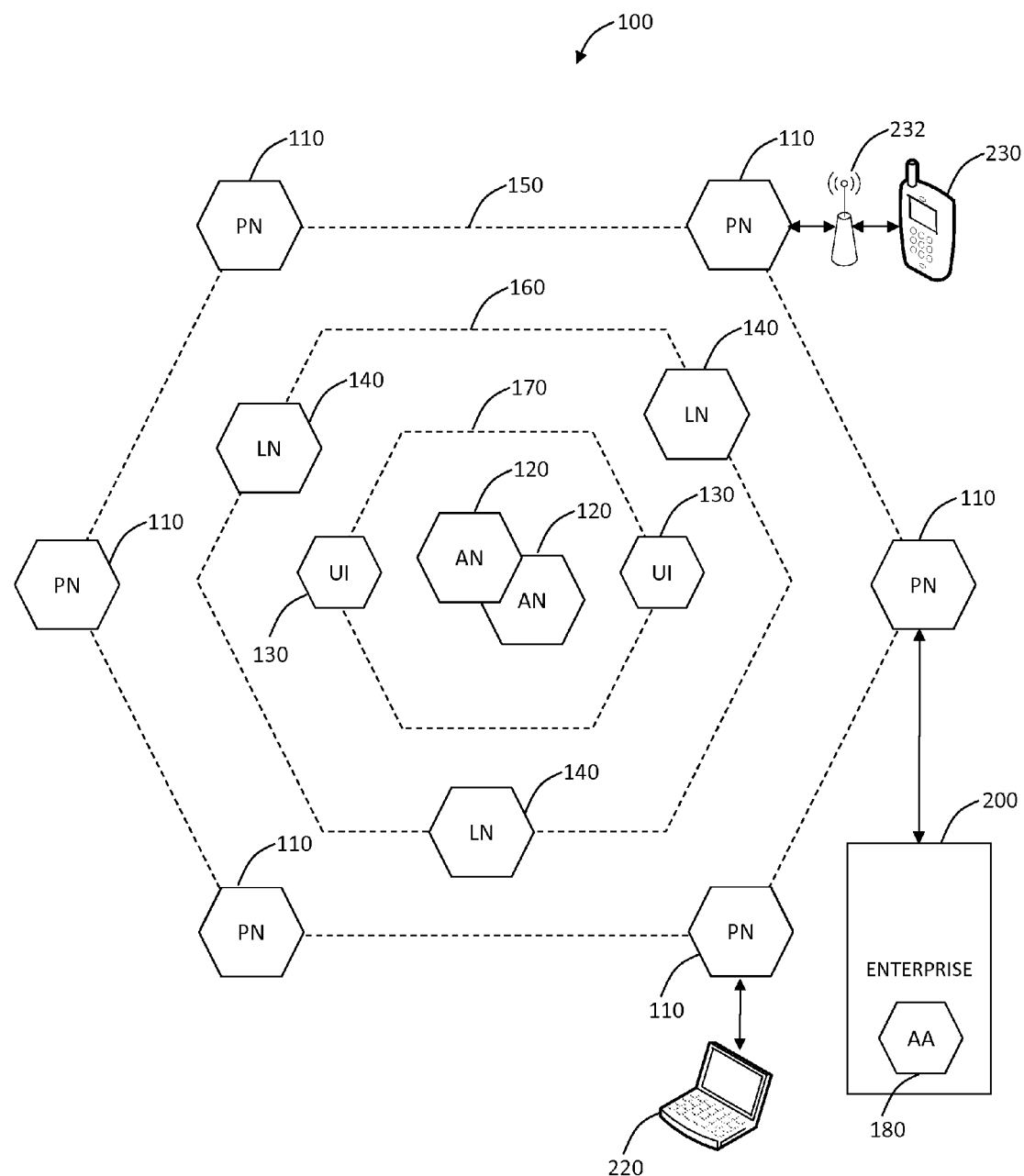
FIG. 1 is a network diagram of a distributed security system that is a cloud system and which can implement archiving systems and methods.

Referring to FIG. 1, in an exemplary embodiment, a block diagram illustrates a distributed security system 100. The system 100 can, for example, be implemented as an overlay network in a wide area network (WAN), such as the Internet, a local area network (LAN), or the like. The system 100 includes content processing nodes, processing nodes 110, that proactively detect and preclude the distribution of security threats, e.g., malware, spyware, viruses, trojans, botnets, email spam, data leakage, policy violations, etc., and other undesirable content sent from or requested by an external system. The system 100 can further monitor Internet traffic for all users connected thereto. Example external systems can include an enterprise 200, a computer device 220, and a mobile device 230, or any other network and computing systems communicatively coupled to the system 100. In an exemplary embodiment, each of the processing nodes 110 cam include a decision system and method, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 can generate a decision vector D=[d1, d2, . . . , dn] for a content item of one or more parts C=[c1, c2, . . . , cm]. Each decision vector can identify a threat classification, e.g., clean, spyware, malware, undesirable content, innocuous, spam email, unknown, data leakage, policy violation, etc. For example, the output of each element of the decision vector D can be based on the output of one or more data inspection engines. In an exemplary embodiment, the threat classification can be reduced to a subset of categories e.g., violating, non-violating, neutral, unknown. Based on the subset classification, the processing node 110 can allow distribution of the content item, preclude distribution of the content item, allow distribution of the content item after a cleaning process, or perform threat detection on the content item. In an exemplary embodiment, the actions taken by one of the processing nodes 110 can be determined based on the threat classification of the content item and on a security policy of the external system to which the content item is being sent from or from which the content item is being requested by. A content item is violating if, for any part C=[c1, c2, . . . , cm] of the content item, at any of the processing nodes 110, any one of the data inspection engines generates an output that results in a classification of "violating."

Figure 3:
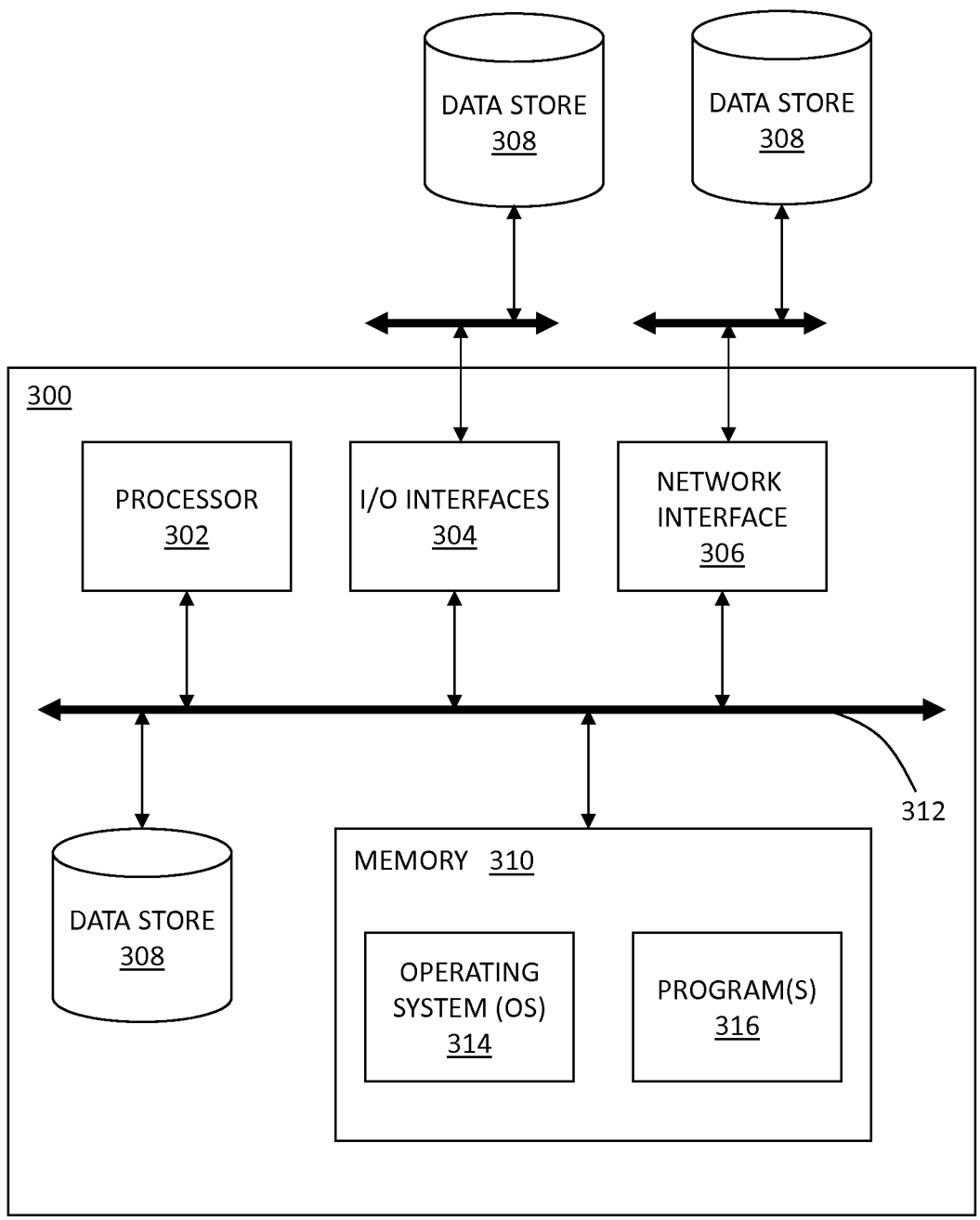
FIG. 3 is a block diagram of a server which may be used in the distributed security system of FIG. 1 or with any other cloud-based system.

Each of the processing nodes 110 can be implemented by one or more of computer and communication devices, e.g., server computers, gateways, switches, etc, such as the server 300 described in FIG. 3. In an exemplary embodiment, the processing nodes 110 can serve as an access layer 150. The access layer 150 can, for example, provide external system access to the security system 100. In an exemplary embodiment, each of the processing nodes 110 can include Internet gateways and one or more servers, and the processing nodes 110 can be distributed through a geographic region, e.g., throughout a country, region, campus, etc. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 can have multiple routers, switches, etc. that are used to communicate over the Internet, and the routers, switches, etc. can be configured to establish communications through the nearest (in traffic communication time or geographically, for example) processing node 110. A mobile device 230 can be configured to communicated to a nearest processing node 110 through any available wireless access device, such as an access point, high-speed wireless access, or a cellular gateway. A single computer device 220, such as a user's personal computer, can have its browser and email program configured to access the nearest processing node 110, which, in turn, serves as a proxy for the computer device 220. Alternatively, an Internet provider can have all of its customer traffic processed through the processing nodes 110.

In an exemplary embodiment, the processing nodes 110 can communicate with one or more authority nodes (AN) 120. The authority nodes 120 can store policy data for each external system as well as global security data, and can distribute the policy data to each of the processing nodes 110. The policy can, for example, define security policies for a protected system, e.g., security policies for the enterprise 200. Example policy data may define access privileges for users, web sites and/or content that is disallowed, restricted domains, acceptable use, data leakage prevention, etc. The authority nodes 120 can distribute the policy data to the processing nodes 110. In an exemplary embodiment, the authority nodes 120 can also distribute threat data that includes the classifications of content items according to threat classifications, e.g., a list of known viruses, a list of known malware sites, spam email domains, a list of known phishing sites, list of data leakage prevention terms, etc. The distribution of threat data between the processing nodes 110 and the authority nodes 120 can implemented by push and pull distribution schemes described in more detail below. In an exemplary embodiment, each of the authority nodes 120 can be implemented by one or more computer and communication devices, e.g., server computers, gateways, switches, etc., such as the server 300 described in FIG. 3. In some exemplary embodiments, the authority nodes 120, the logging nodes 140, and user interface (UI) front-ends 130 can serve as an application layer 160. The application layer 160 can, for example, manage and provide policy data, threat data, and data inspection engines and dictionaries for the processing nodes 110.

Other application layer functions can also be provided in an application layer 170, such as the user interface (UI) front-end 130. The user interface front-end 130 can provide a user interface through which users of the external systems can provide and define security policies, e.g., whether email traffic is to be monitored, whether certain web sites are to be precluded, etc. Another application capability that can be provided through the user interface front-end 130 is security analysis and log reporting. The underlying data on which the security analysis and log reporting functions operate are stored in logging nodes (LN) 140, which serve as a data logging layer, i.e. the application layer 160 can be referred to as the data logging layer. Each of the logging nodes 140 can store data related to security operations and network traffic processed by the processing nodes 110 for each external system. In an exemplary embodiment, the logging node 140 data can be anonymized so that data identifying an enterprise is removed or obfuscated. For example, identifying data can be removed to provide an overall system summary of security processing for all enterprises and users without revealing the identity of any one account. Alternatively, identifying data can be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data can be further encrypted, e.g., so that only the enterprise (or user if a single user account) can have access to the logging node 140 data for its account. Other processes of anonymizing, obfuscating, or securing logging node 140 data may also be used.

In an exemplary embodiment, an access agent 180 can be included in the external systems. For example, the access agent 180 is deployed in the enterprise 200. The access agent 180 can, for example, facilitate security processing by providing a hash index of files on a client device to one of the processing nodes 110, or can facilitate authentication functions with one of the processing nodes 110, e.g., by assigning tokens for passwords and sending only the tokens to a processing node so that transmission of passwords beyond the network edge of the enterprise is minimized. Other functions and processes can also be facilitated by the access agent 180. In an exemplary embodiment, the processing node 110 can act as a forward proxy that receives user requests to external servers addressed directly to the processing node 110. In another exemplary embodiment, the processing node 110 can access user requests that are passed through the processing node 110 in a transparent mode. A protected system, e.g., enterprise 200, can, for example, choose one or both of these modes. For example, a browser can be configured either manually or through the access agent 180 to access the processing node 110 in a forward proxy mode. In the forward proxy mode, all accesses are addressed to the processing node 110.

In an exemplary embodiment, an enterprise gateway can be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols can be used. In another exemplary embodiment, the processing nodes can may be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected. For example, at the within the enterprise the access agent 180 can be configured to perform MPLS labeling. In another transparent proxy mode exemplary embodiment, a protected system, such as the enterprise 200, can identify the processing node 110 as a next hop router for communication with the external servers.

Generally, the distributed security system 100 is an exemplary cloud based system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one exemplary embodiment of a cloud based system, and those of ordinary skill in the art will recognize the archiving systems and methods contemplate operation on or with any cloud based system.

Operationally, the system 100 can provide policy-based, secure Internet access for any device, anywhere. The system 100 can be viewed as a cloud based security system. Traditionally, security was delivered as software which was installed on servers. Installation and deployment required time and expertise, prompting the migration to appliances. While the hardware simply plugs into existing infrastructures, multiple appliances must be installed at each gateway and an assortment of point products must be used to provide comprehensive security. Managing multiple user interfaces, policy managers, and log files is expensive, inefficient, and incomplete. In contrast, the system 100 provides SaaS, or cloud-delivered, security services. By analogy, rather than cleaning one's own water, one prefers water delivered through a tap on-demand; rather than generating one's own power, one prefers power delivered through power lines on-demand. In the same way, appliances are giving way to security as a service such as through the system 100 or the like.

Using the system 100, IT administrators or the like define policies and simply forward corporate Internet traffic to the system 100. The system 100 allows or blocks the traffic and can be used for all users, including the enterprise 200, the computer device 220, and the mobile device 230. The enterprise 200 can include an organization's home and regional offices, the computer device 220 and the mobile device 230 can include road warriors, mobile phone users, home-based employees, etc. Specifically, users such as the enterprise 200, the computer device 220, and the mobile device 230 are all accessing external systems, e.g. the Internet, by way of the system 100, i.e. through one of the processing nodes 110. As such, security for the users 200, 220, 230 is pervasive and always present. There is no capital expenditure as investments are not required for either hardware or software at the users 200, 220, 230. SaaS and the system 100 frees precious IT resources from performing operational security chores of managing and patching boxes, and updating data feeds and signatures. It enables IT to focus on strategic security such as policy and architecture.

The system 100 can be configured to perform numerous functions including data aggregation, correlation, alerting, dashboard, compliance, retention, and the like. For example, the system 100 can aggregate data from many sources, including network, security, servers, databases, applications, providing the ability to consolidate monitored data to help avoid missing crucial events. The system 100 can perform correlation by looking for common attributes to link events together into meaningful bundles. Accordingly, the system 100 provides the ability to perform a variety of correlation techniques to integrate different sources, in order to turn data into useful information. The system 100 can use the automated analysis of correlated events for the production of alerts, to notify of immediate issues. The system 100 can provide dashboards tools which take event data and turn it into informational charts to assist in seeing patterns, or identifying activity that is not forming a standard pattern. The system 100 can be employed to automate the gathering of compliance data, producing reports that adapt to existing security, governance and auditing processes. Also, the system 100 can employ long-term storage of historical data to facilitate correlation of data over time, and to provide the retention necessary for compliance requirements.

Figure 2:
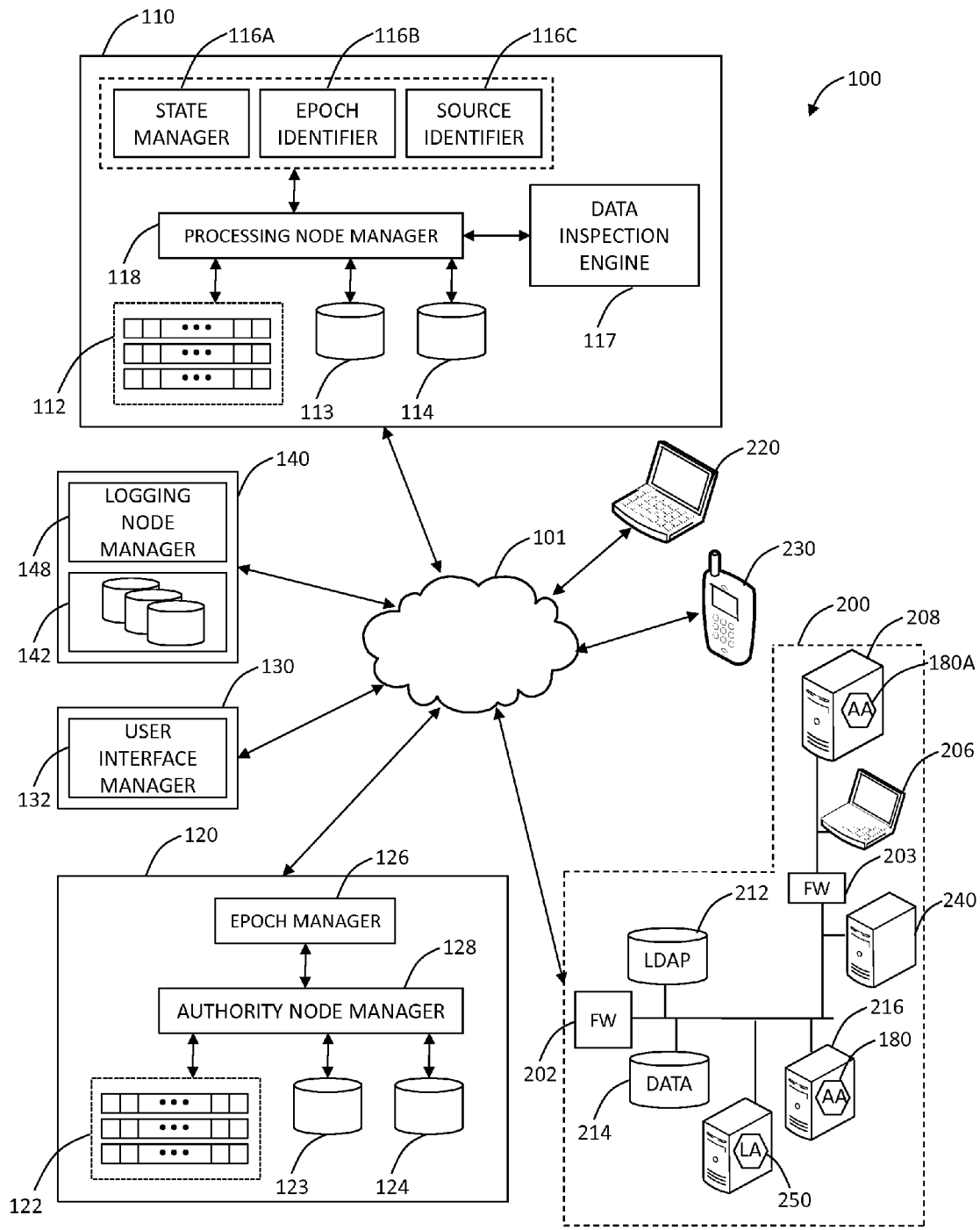
FIG. 2 is a network diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there can be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 therebetween. The external systems 200, 220 and 230 likewise communicate over the WAN 101 with each other or other data providers and publishers (not shown), i.e., any content on any network. Some or all of the data communication of each of the external systems 200, 220 and 230 may be processed through the processing node 110.

FIG. 2 also shows the enterprise 200 in more detail. The enterprise 200 can, for example, include a firewall (FW) 202 protecting an internal network that may include one or more enterprise servers 216, a lightweight directory access protocol (LDAP) server 212, and other data or data stores 214. Another firewall 203 can protect an enterprise subnet that can include user computers 206 and 208 (e.g., laptop and desktop computers). The enterprise 200 can communicate with the WAN 101 through one or more network devices, such as a router, gateway, switch, etc. The LDAP server 212 can store, for example, user login credentials for registered users of the enterprise 200 system. Such credentials can include a user identifiers, login passwords, and a login history associated with each user identifier. The other data stores 214 can include sensitive information, such as bank records, medical records, trade secret information, or any other information warranting protection by one or more security measures. It should be appreciated by those of ordinary skill in the art that FIG. 2 depicts the system 100 and the enterprise 200 in an oversimplified manner, and a practical embodiment may include additional devices that are not described in detail herein.

In an exemplary embodiment, a client access agent 180a can be included on a client computer 208. The client access agent 180a can, for example, facilitate security processing by providing a hash index of files on the user computer 208 to a processing node 110 for malware, virus detection, etc. Other security operations can also be facilitated by the access agent 180a, and the client access agent 180a can be installed on any computing device. In another exemplary embodiment, a server access agent 180 can facilitate authentication functions with the processing node 110, e.g., by assigning tokens for passwords and sending only the tokens to the processing node 110 so that transmission of passwords beyond the network edge of the enterprise 200 is minimized. Other functions and processes can also be facilitated by the server access agent 180b. The computer device 220 and the mobile device 230 can also store information warranting security measures, such as personal bank records, medical information, and login information, e.g., login information to the server 206 of the enterprise 200, or to some other secured data provider server.

In an exemplary embodiment, the processing nodes 110 are external to network edges of the external systems 200, 220 and 230. That is, the processing nodes 110 are connected to the external systems 200, 220 and 230, and not physically part thereof. For example, the processing nodes 110 could be located at data centers and the like and the external systems 200, 220 and 230 can connect to the processing nodes 110 through various networks over various network connectivity types (e.g., wireless, wired, etc.). Each of the processing nodes 110 stores security policies 113 received from the authority node 120 and monitors content items requested by or sent from the external systems 200, 220 and 230. In an exemplary embodiment, each of the processing nodes 110 can also store a detection process filter 112 and/or threat data 114 to facilitate the decision of whether a content item should be processed for threat detection. A processing node manager 118 can manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item can be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 can include a state manager 116A. The state manager 116A can be used to maintain the authentication and the authorization states of users that submit requests to the processing node 110. Maintenance of the states through the state manager 116A can minimize the number of authentication and authorization transactions that are necessary to process a request. An example of this state management is described in commonly assigned U.S. patent application Ser. No. 12/179,377, filed Jul. 24, 2008, and entitled "HTTP AUTHENTICATION AND AUTHORIZATION MANAGEMENT," the contents of which are incorporated by reference herein. Note, authentication determines who a user is whereas authorization determines if the user is authorized to do a certain thing. The processing node 110 can also include an epoch processor 116B. The epoch processor 116B can be used to analyze authentication data that originated at the authority node 120. The epoch processor 116B can use an epoch ID to further validate the authenticity of authentication data. The processing node 110 can further include a source processor 116C. The source processor 116C can be used to verify the source of authorization and authentication data. The source processor 116C can identify improperly obtained authorization and authentication data, enhancing the security of the network. Collectively, the state manager 116A, the epoch processor 116B, and the source processor 116C operate as data inspection engines.

Because the amount of data being processed by the processing nodes 110 can be substantial, the detection processing filter 112 can be used as the first stage of an information lookup procedure. For example, the detection processing filter 112 can be used as a front end to a looking of the threat data 114. Content items can be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 can identify the Uniform Resource Locator (URL) address of URL requests as the information key and hash the URL address; or can identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 can improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances can include, for example, whether a given file has been virus scanned, whether content at a given URL has been scanned for inappropriate (e.g., pornographic) content, whether a given fingerprint matches any of a set of stored documents, whether data contains data leakage prevention terms, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 can be a Bloom filter implemented by a single hash function. The Bloom filter can be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 can be distributed to the processing nodes 110, which then store a local copy of the detection processing filter 112.

In an exemplary embodiment, the authority node 120 can include an epoch manager 126. The epoch manager 126 can be used to generate authentication data associated with an epoch ID. The epoch ID of the authentication data is a verifiable attribute of the authentication data that can be used to identify fraudulently created authentication data. In an exemplary embodiment, the detection processing filter 122 can be a guard table. The processing node 110 can, for example, use the information in the local detection processing filter 112 to quickly determine the presence and/or absence of information, e.g., whether a particular URL has been checked for malware; whether a particular executable has been virus scanned, etc. The authority node 120 can also store master threat data 124. The master threat data 124 can classify content items by threat classifications, e.g., a list of known viruses, a list of known malware sites, spam email domains, list of known or detected phishing sites, data leakage terms, etc. The authority node manager 128 can be used to manage the master threat data 124, e.g., receive updates from the processing nodes 110 when one of the processing nodes 110 has processed a content item and update the master threat data 124 with any pertinent results. In some implementations, the master threat data 124 can be distributed to the processing nodes 110, which then store a local copy of the threat data 114. In another exemplary embodiment, the authority node 120 can also monitor the health of each of the processing nodes 110, e.g., the resource availability in each of the processing nodes 110, detection of link failures, etc. Based on the observed health of each of the processing nodes 110, the authority node 120 can redirect traffic among the processing nodes 110 and/or balance traffic among the processing nodes 110. Other remedial actions and processes can also be facilitated by the authority node 110.

The processing node 110 and the authority node 120 can be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 can manage the content item according to the security classification of the content item and the security policy of the external system. If, however, the content item is determined to not be classified by the threat data 114, then the processing node manager 118 can cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 can automatically transmit the updated threat data to the other processing nodes 110. Accordingly, threat data for new threats as the new threats are encountered are automatically distributed to each processing node 110. Upon receiving the new threat data from the authority node 120, each of processing node managers 118 can store the updated threat data in the locally stored threat data 114. In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 can manage the content item according to the security classification of the content item and the security policy of the external system. If, however, the content item is determined to not be classified by the threat data, then the processing node manager 118 can request responsive threat data for the content item from the authority node 120. Because processing a content item can consume valuable resource and time, in some implementations the processing node 110 can first check with the authority node 120 for threat data 114 before committing such processing resources.

The authority node manager 128 can receive the responsive threat data request from the processing node 110 and can determine if the responsive threat data is stored in the authority node data store. If responsive threat data is stored in the master threat data 124, then the authority node manager 128 provide a reply that includes the responsive threat data to the processing node 110 so that the processing node manager 118 can manage the content item in accordance with the security policy data 112 and the classification of the content item. Conversely, if the authority node manager 128 determines that responsive threat data is not stored in the master threat data 124, then the authority node manager 128 can provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it can determine if the content item is classified by the threat data 114. Because the detection process filter 112 has the potential for a false positive, a lookup in the threat data 114 can be implemented to ensure that a false positive has not occurred. The initial check of the detection process filter 112, however, can eliminate many null queries to the threat data 114, which, in turn, conserves system resources and increases efficiency. If the content item is classified by the threat data 114, then the processing node manager 118 can manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, can update the master threat data 124 and the master detection process filter 122 stored in the authority node data store according to the threat data update received from the processing node 110. In an exemplary embodiment, the authority node manager 128 can automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114. In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it can determine if the content item is classified by the threat data 114. Because the detection process filter 112 has the potential for a false positive, a lookup in the threat data 114 can be implemented to ensure that a false positive has not occurred. The initial check of the detection process filter 112, however, can eliminate many null queries to the threat data 114, which, in turn, conserves system resources and increases efficiency. If the processing node manager 118 determines that the content item has not been processed, it can request responsive threat data for the content item from the authority node 120. Because processing a content item may consume valuable resource and time, in some implementations the processing node 110 can first check with the authority node 120 for threat data 114 before committing such processing resources.

The authority node manager 128 can receive the responsive threat data request from the processing node 110 and can determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 can provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated herewith. The data inspection engines 116, processing node manager 118, authority node manager 128, user interface manager 132, logging node manager 148, and authority agent 180 can be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

The logging nodes 140 can include the logging node manager 148 that is communicatively coupled to data stores 142. As described herein, each of the logging nodes 140 can store data related to security operations and network traffic processed by the processing nodes 110 for each external system. In an exemplary embodiment, the logging nodes 140 can provide web logs of all visited URLs by user and the like. The logging nodes 140 can also log other data based on any number of parameters for future reporting, correlating, analysis, etc. The interactive analytics systems and methods provide a mechanism for visualizing data from the logging nodes 140 (or any other devices associated with the system 100).

Referring to FIG. 3, in an exemplary embodiment, a block diagram illustrates a server 300 which can be used in the system 100 or standalone. Any of the processing nodes 110, the authority nodes 120, and the logging nodes 140 can be formed through one or more servers 300. Further, the computer device 220, the mobile device 230, the servers 208, 216, the internal management system 240, the logging agent 250, etc. can include the server 300 or a similar structure. The server 300 can be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 can include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 can be used to receive user input from and/or for providing system output to one or more devices or components. User input can be provided via, for example, a keyboard, touch pad, and/or a mouse. System output can be provided via a display device and a printer (not shown). I/O interfaces 304 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 can be used to enable the server 300 to communicate on a network, such as the Internet, the WAN 101, the enterprise 200, and the like, etc. The network interface 306 can include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 306 can include address, control, and/or data connections to enable appropriate communications on the network. A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the server 300 such as, for example, an internal hard drive connected to the local interface 312 in the server 300. Additionally in another embodiment, the data store 308 can be located external to the server 300 such as, for example, an external hard drive connected to the I/O interfaces 304 (e.g., SCSI or USB connection). In a further embodiment, the data store 308 can be connected to the server 300 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 can incorporate electronic, magnetic, optical, and/or other types of storage media. Note that the memory 310 can have a distributed architecture, where various components are situated remotely from one another, but can be accessed by the processor 302. The software in memory 310 can include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Figure 4:
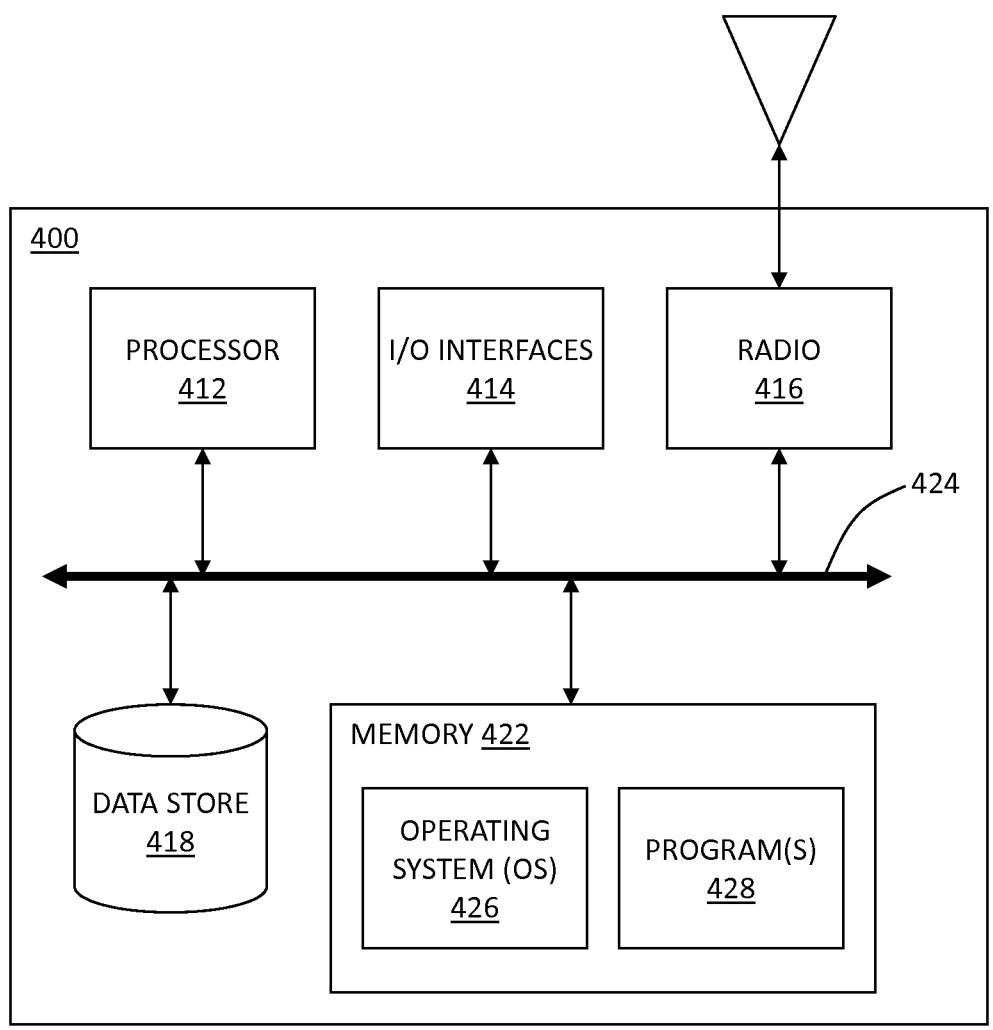
FIG. 4 is a block diagram of a mobile device which may be used in the distributed security system of FIG. 1 or with any other cloud-based system.

Referring to FIG. 4, in an exemplary embodiment, a block diagram illustrates a mobile device 400, which can be used in the system 100 or the like. The mobile device 400 can be a digital device that, in terms of hardware architecture, generally includes a processor 412, input/output (I/O) interfaces 414, a radio 416, a data store 418, and memory 422. It should be appreciated by those of ordinary skill in the art that FIG. 4 depicts the mobile device 400 in an oversimplified manner, and a practical embodiment can include additional components and suitably configured processing logic to support known or conventional operating features that are not described in detail herein. The components (412, 414, 416, 418, and 422) are communicatively coupled via a local interface 424. The local interface 424 can be, for example but not limited to, one or more buses or other wired or wireless connections, as is known in the art. The local interface 424 can have additional elements, which are omitted for simplicity, such as controllers, buffers (caches), drivers, repeaters, and receivers, among many others, to enable communications. Further, the local interface 424 may include address, control, and/or data connections to enable appropriate communications among the aforementioned components.

The processor 412 is a hardware device for executing software instructions. The processor 412 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 412 is configured to execute software stored within the memory 422, to communicate data to and from the memory 422, and to generally control operations of the mobile device 410 pursuant to the software instructions. In an exemplary embodiment, the processor 412 may include a mobile optimized processor such as optimized for power consumption and mobile applications. The I/O interfaces 414 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 414 can also include, for example, a serial port, a parallel port, a small computer system interface (SCSI), an infrared (IR) interface, a radio frequency (RF) interface, a universal serial bus (USB) interface, and the like. The I/O interfaces 414 can include a graphical user interface (GUI) that enables a user to interact with the mobile device 400. Additionally, the I/O interfaces 414 may further include an imaging device, i.e. camera, video camera, etc.

The radio 416 enables wireless communication to an external access device or network. Any number of suitable wireless data communication protocols, techniques, or methodologies can be supported by the radio 416, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 418 can be used to store data. The data store 418 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 418 can incorporate electronic, magnetic, optical, and/or other types of storage media.

The memory 422 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 422 may incorporate electronic, magnetic, optical, and/or other types of storage media. Note that the memory 422 can have a distributed architecture, where various components are situated remotely from one another, but can be accessed by the processor 412. The software in memory 422 can include one or more software programs, each of which includes an ordered listing of executable instructions for implementing logical functions. In the example of FIG. 4, the software in the memory system 422 includes a suitable operating system (O/S) 426 and programs 428. The operating system 426 essentially controls the execution of other computer programs, and provides scheduling, input-output control, file and data management, memory management, and communication control and related services. The programs 428 can include various applications, add-ons, etc. configured to provide end user functionality with the mobile device 400. For example, exemplary programs 428 can include, but not limited to, a web browser, social networking applications, streaming media applications, games, mapping and location applications, electronic mail applications, financial applications, and the like..

Figure 5:
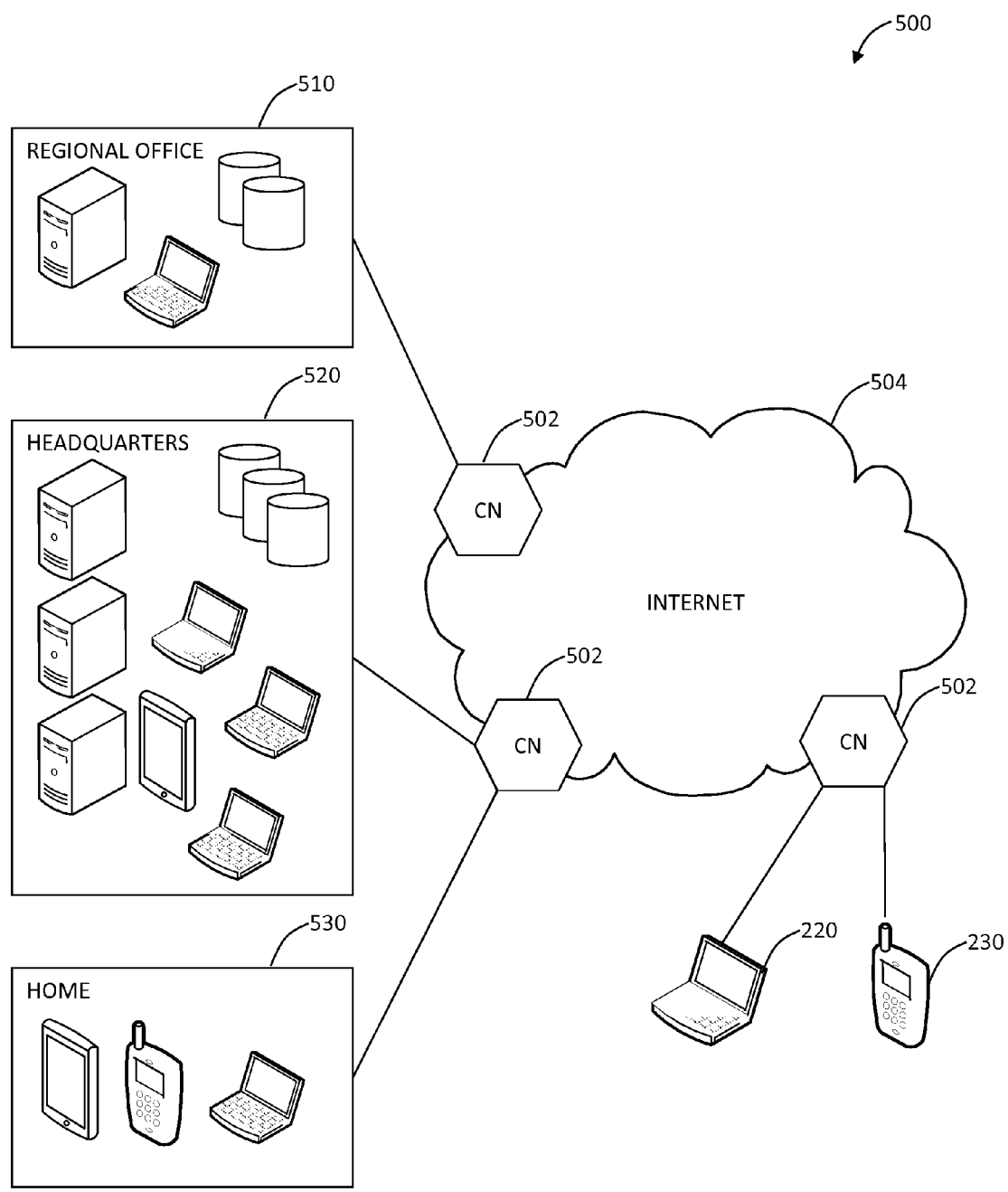
FIG. 5 is a network diagram of another cloud system which can implement the archiving systems and methods.

Referring to FIG. 5, in an exemplary embodiment, another exemplary cloud system 500 is illustrated for providing cloud-based services. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud based system. In the cloud system 500, traffic from various locations (and various devices located therein) such as a regional office 510, headquarters 520, various employee's homes 530, a mobile laptop 220, and a mobile device 230 is redirected to the cloud through the cloud nodes 502. That is, each of the locations 510, 520, 530, 220, 230 is communicatively coupled to the Internet 504 through the cloud nodes 502. The cloud system 500 can be configured to perform various functions such as spam filtering, uniform resource locator (URL) filtering, antivirus protection, bandwidth control, data loss prevention, zero day vulnerability protection, web 2.0 features, and the like. In an exemplary embodiment, the cloud system 500 and the distributed security system 100 can be viewed as Security-as-a-Service through the cloud.

Architecturally, the systems 100, 500 generally at least include the processing nodes 110 and the cloud nodes 502 for interfacing with the users 510, 520, 530, 220, 230. In an exemplary embodiment, all functions described herein can be incorporated in the processing nodes 110 and the cloud nodes 502. In another exemplary embodiment, the functions can be distributed. For example, the system 500 includes the singular cloud nodes 502 while the system 100 includes the processing nodes 110, the authority nodes 120, the logging nodes 140, etc. The term node as used herein can be a single computer, cluster of servers, or a functional module running on a computer, server, etc. Note, the cloud system 500 can perform data logging functionality at the cloud nodes 502.

Figure 6:
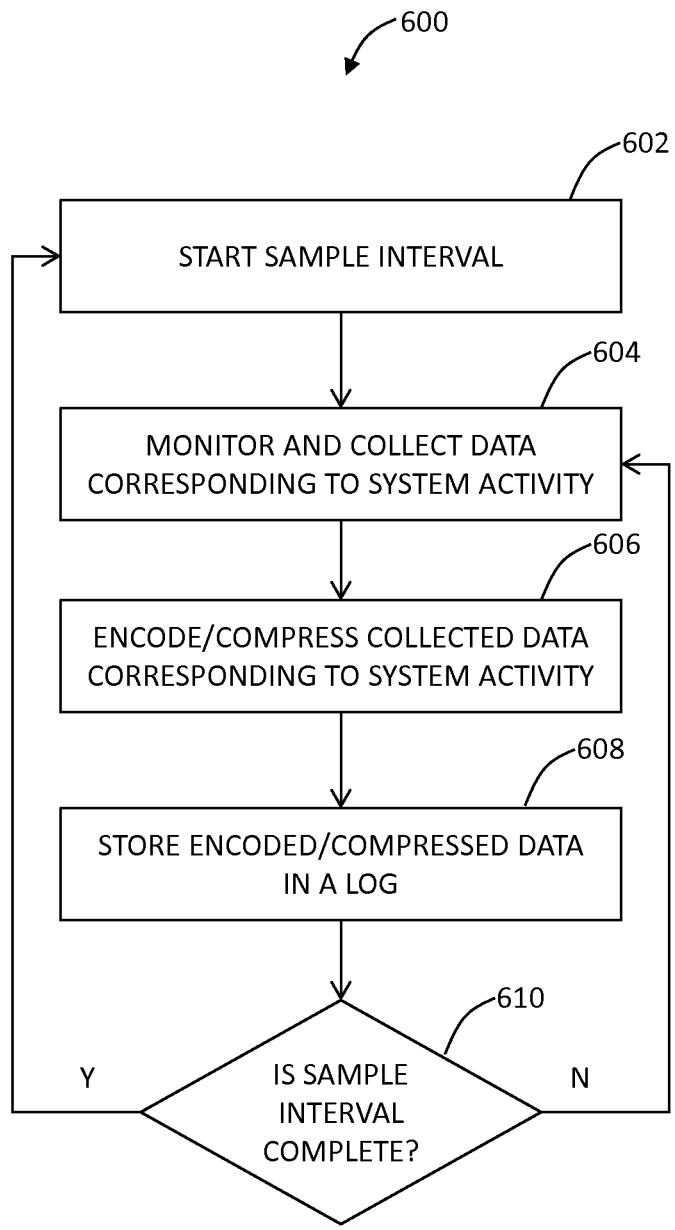
FIG. 6 is a flowchart of a network monitoring method for interactive analytics of Internet traffic.

Referring to FIG. 6, in an exemplary embodiment, a flowchart illustrates a network monitoring method 600 for interactive analytics of Internet traffic. The method 600 can operate over a sample interval (step 602). Note, the method 600 can also operate continuously with the sample interval just representing a break in collection. For example, the sample interval can be a minute, 15 minutes, etc. The method 600 monitors and collects data corresponding to system activity (step 604). As described herein in the context of the systems 100, 500, users are configured to communicate through the nodes 110, 502. In the method 600, the nodes 110, 502 are configured to collect data corresponding to system activity. The system activity can be any Internet request (e.g., URL request) or the like. The collected data corresponding to system activity can be encoded/compressed (step 606). Note, the system activity can include data related to an Internet request (e.g., User name, MAC address, IP address, URL, etc.), data related to a security event (e.g., blocked content, malware, virus, data leakage, etc.), data related to suspicious activity (e.g., legal liability, productivity loss, social networking, etc.), data related to file transfers (e.g., email, file transfer protocol, dropbox, etc.), data related to online chats or instant messaging (e.g., transcripts, etc.), data related to keyword monitoring (e.g., data leakage prevention, etc.), and the like. The encoded/compressed data is stored in a log (step 608). Finally, the method either starts a new sample interval (step 610) or continues in the same interval (step 610).

Examples of the compressed format are disclosed in commonly assigned U.S. patent application Ser. No. 12/185,443 filed Aug. 4, 2008 and entitled "ENCODING AND COMPRESSION OF STATISTICAL DATA," the contents of which are incorporated by reference herein. As can be expected, the nodes 110, 502 can generate significant amounts of data based on multiple users being monitored continuously for all Internet activity. The purpose of the encoding/compression is to reduce log storage requirements. The compressed format can include Presence Vector, Differential Compression, Zero Byte Compression, Opcode compression, LZ77, Delta Compression, 1 bit compression, and the like. In operation, the data can include different data types such as constant data, time varying and predictable data, occasionally occurring data, time varying and linear data, whole records of data, time varying data, data that varies by one, and the like. For example, the following table provides examples of the types of compression that can be used for the different data types in the data.

| Data Type | Compression Process | Typical compression ratio |
|---|---|---|
| Constant Data | Presence Vector | 1:50 |
| Time varying, predictable | Differential Compression | 1:4 |
| Occasional Occurrence | Zero Byte Compression | High (1:100) |
| Time varying, linear | Opcode compression | 1:8 |
| Whole records | LZ77 | 1:4 |
| Time varying | Delta Compression | 1:10 |
| Vary by 1 | 1 bit compression | 1:8 |

Each record of the encoded/compressed data can have different fields corresponding to one of the data types listed above. For example, a user's identification (name, IP address, MAC address, etc.) would be constant data, i.e. the same for each field associated with the user. Of note, in studies, more than 80% of traffic leaving an enterprise is Hypertext Transfer Protocol (HTTP) or HTTPS (HTTP secure) traffic, and monitoring of this traffic generates massive amounts of logs. For example, a typical Fortune 500 company could generate 30-100 Gb of web logs every day. Further, companies typically have multiple Internet gateways generating multiple, disjointed web logs which fail to provide a consolidated view of overall corporate Internet activity. Companies retain such logs for a variety of reasons including to analyze security issues, to minimize IT downtime, to prevent system misuse, for compliance, etc.

The method 600 can, for example, be implemented in a processing node in the system 100 of FIGS. 1 and 2 or in a cloud node 502 of the system 500 of FIG. 5. In an exemplary embodiment, one advantage of the systems 100, 500 in implementing the method 600 is that all traffic from an organization's users can be monitored despite geographic differences (i.e., different offices in different geographic locations) and device differences (i.e., individual users having a desktop in the office, a laptop for travel/home use, a smart phone/tablet for mobile use, etc.). That is, an advantage of the cloud based systems 100, 500 is they can monitor the organization in an all inclusive manner regardless of location or platform. This provides the method 600 with an all encompassing view of an organization's traffic.

Figure 7:
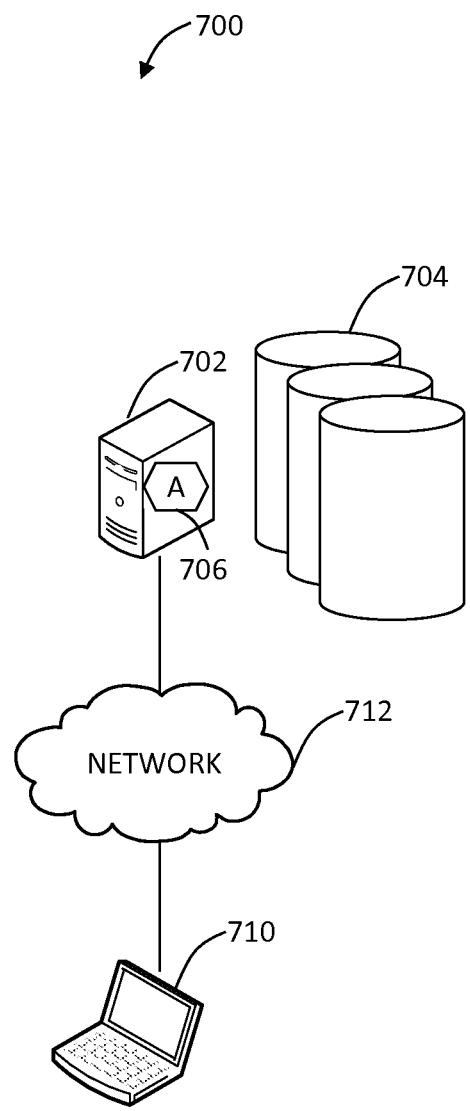
FIG. 7 is a network diagram of an interactive analytics system for Internet traffic.

Referring to FIG. 7, in an exemplary embodiment, a network diagram illustrates an interactive analytics system 700 for Internet traffic. The system 700 includes one or more servers 702 coupled to logs 704. The servers 702 include an interactive analytics tool 706 operating thereon. The tool 706 can include software that enables a user 710 to perform interactive analytics on Internet traffic data stored in the logs 704. The user 710 can access the servers 704 through a network 712 which can include any of the Internet, a virtual private network (VPN), a local area network (LAN), a wireless LAN, or combinations thereof. The logs 704 can include data such as collected using the systems 100, 500 and the method 600. In an exemplary embodiment, the logs 704 can be Nanologs (tm) from Zscaler, Inc. (www.zscaler.com). The logs 704 can include all Internet traffic (HTTP/HTTPS) from all corporate users. In an exemplary embodiment, the user 710 can access the analytics tool 706 over an HTTP/HTTPS connection with the servers 702. That is, the analytics tool 706 can be via a web graphical user interface (GUI) to the user 710.

The analytics tool 706 is configured with state-of-the-art drill down capabilities, a complete end-to-end workflow while maintaining a historical trail of charts produced during the investigation. This enables the user 710 to go back at any point in time to review the details of each step of the investigation. Moreover, the user 710 may modify any step of the investigation and alter the path of the investigation from that point going forward—without having to restart the investigation from scratch. In addition, the analytics tool 706 enables the user 710 to generate am export file (such as in Portable Document Format (PDF)) which can then be sent to the relevant stakeholders that had requested the investigation—this may the HR department, a manager investigating one of his employees, or even a CIO looking for details on a developing traffic trend in the organization. Lastly, this analytics capability is available as a standalone feature but also can be initiated from any chart in the reporting interface by clicking on a segment of the chart and selecting "Further Analysis" which makes the tool even more versatile and powerful.

Figure 8:
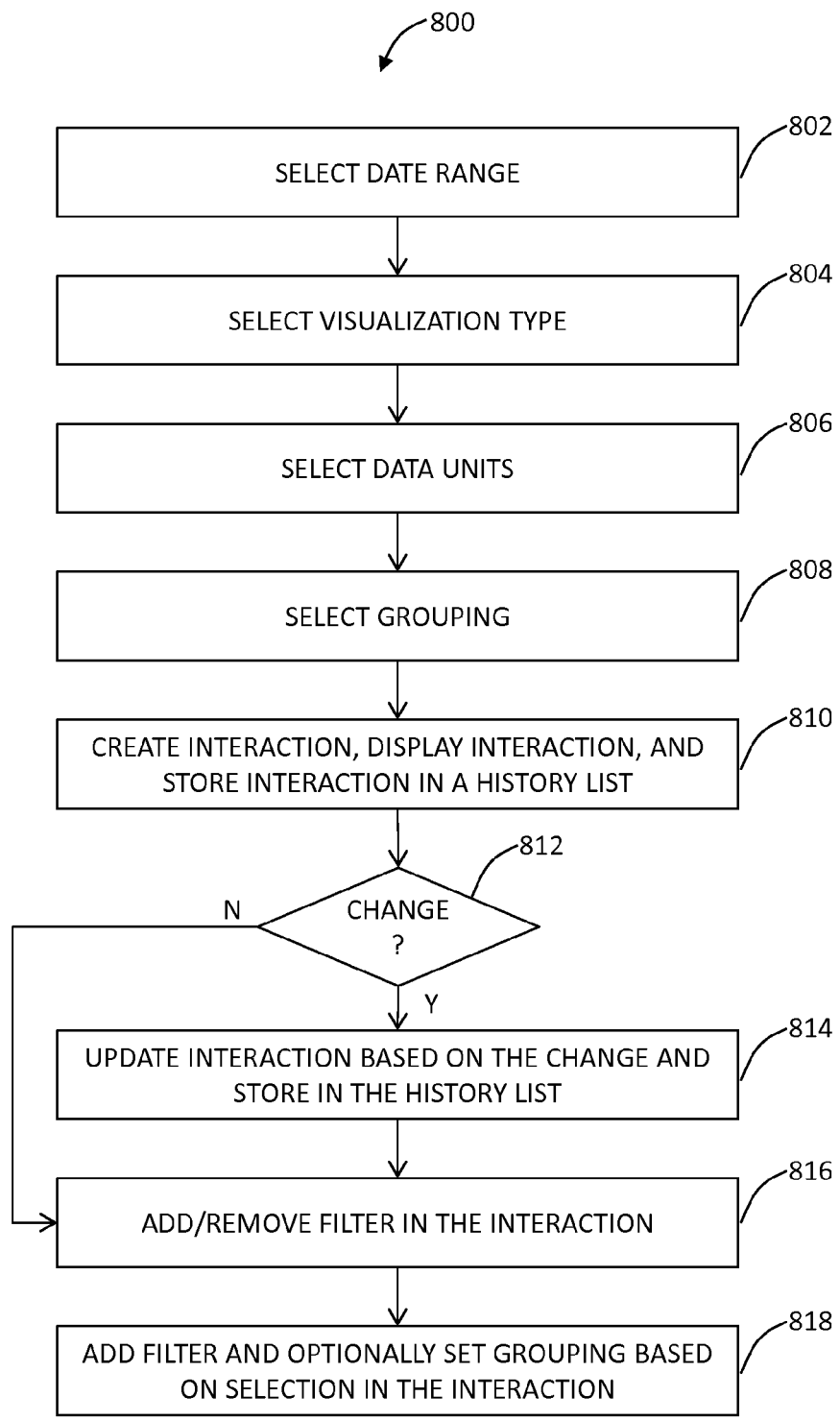
FIG. 8 is a flowchart of an interactive analytics method for interactive analytics of Internet traffic such as web browsing statistics and the like for providing various intuitive mechanisms for interaction with data visualizations.

Referring to FIG. 8, in an exemplary embodiment, a flowchart illustrates an interactive analytics method 800 for interactive analytics of Internet traffic such as web browsing statistics and the like for providing various intuitive mechanisms for interaction with data visualizations. The method 800 can be implemented with the systems 100, 500, 700 and with the method 600. For example, the system 700 can be a subset of the systems 100, 500, and the systems 100, 500 can use the method 600 to collect data. The method 800 provides visualization of the data collected by the method 600 and stored in the logs 704 of the system 700. That is, the method 800 can be used for forensic and/or analytic investigations to mine enormous amounts of data in the logs 704. The method 800 allows organizations, through administrators, to analyze information about Internet use, such as employee activity, web mail and attachments sent, information published on social networking sites, instant messaging transcripts, etc. Thus, the method 800 allows organizations to mine the logs 704 for investigations, such as for regulatory reasons or internal inquiries. Through the method 800, administrators can see a drill-down of activities of specific periods of time, employees, departments, locations, and more. The steps shown in FIG. 8 for the method 800 can be executed independently and concurrently as appropriate and in any order.

The method 800 provides a visual interaction of data for a user. The method 800 includes selecting a date range (step 802). The date range can include the current day, current week, current month, previous day, previous week, previous month, or any custom range at any granularity (days, hours, minutes, seconds etc.). The method 800 includes selecting a visualization type for the interaction (step 804). For example, the visualization type is indicative of how the interaction is presented and can include a bar chart, a pie chart, a line chart, a totals lists, a summary table, a table of transactions, etc. In an exemplary embodiment, there can be a default visualization type such as a trend chart, and the user could start by adding a filter to the default type. Also, each time a new visualization is selected; a new chart can be created and included in a history list. The method 800 includes selecting data units for the interaction (step 806). The data units can include transactions (i.e., a number of transactions), data bytes, and in some cases time such as when a grouping is set to a domain. The method 800 includes selecting a grouping for the interaction (step 808). The grouping is indicative of the type of information for the interaction. For example, the grouping can include Application Class, Threat Class, Basic Threat Class, Basic Threat Type, Data Leakage Prevention (DLP) Class, DLP Dictionary, DLP Engine, Instant Message (IM) Direction, Location, Social Direction, Department, User Direction, URL Class, URL Category, URL Super-Category, Action, Web Application, Webmail Direction, Domain, etc.

With the date range, the visualization type, the data units, and the grouping selected, the method 800 creates the interaction, displays the interaction, and stores the interaction in a history list (step 810). Specifically, based on the selections, the method 800 obtains the requisite data from the logs 704, i.e. based on the date, data units, and grouping, and displays the interaction based on the visualization type. The method 800 also stores the interaction in a history list that stores a record of the order of the user's investigation. Once created, the user can change any of the aforementioned selections (step 812). If there is a change, the method 800 updates the interaction based on the change and stores the updated interaction in the history list (step 814). Once the interaction is finalized and presented to the user, the user can modify the presentation such as adding/removing a filter in the interaction (step 816). The filter can add/remove data in the interaction such as by Application Class, Threat Class, Basic Threat Class, Basic Threat Type, DLP Class, DLP Dictionary, DLP Engine, IM Direction, Location, Social Direction, Department, User Direction, URL Class, URL Category, URL Super-Category, Action, Web Application, Webmail Direction, etc.

For the transaction table visualization, the filters could include, for example, Action, Advanced Threat Type, Application Class, Basic Threat Class, Basic Threat Type, DLP Class, DLP Dictionary, DLP Engine, Direction, IM Direction, Social Direction, Streaming Direction, Threat Class, URL Category, URL class, URL Super Category, User, Web Application, Web Mail Direction, File Type, File Subtype, File Search, Received Byes, Sent Bytes, Total Bytes, Protocols, Location, Department, Threat Search, URL Search, Host Search, Path Search, User Agent, Referrer Search, Client IP, Server IP, etc. Additionally, the method 800 can include adding a filter and optionally setting a grouping based on a selection in the interaction (step 816). For example, the user could select one piece of visual data in the interaction and select a grouping for that visual data. Assume the visualization includes a graph of transactions grouped by URL class (e.g., general browsing, productivity loss, legal liability, etc.), application class (e.g., social networking, streaming content, etc.), etc. The user could select a particular graph and further drill down and group this content in a new interaction.

Figure 9:
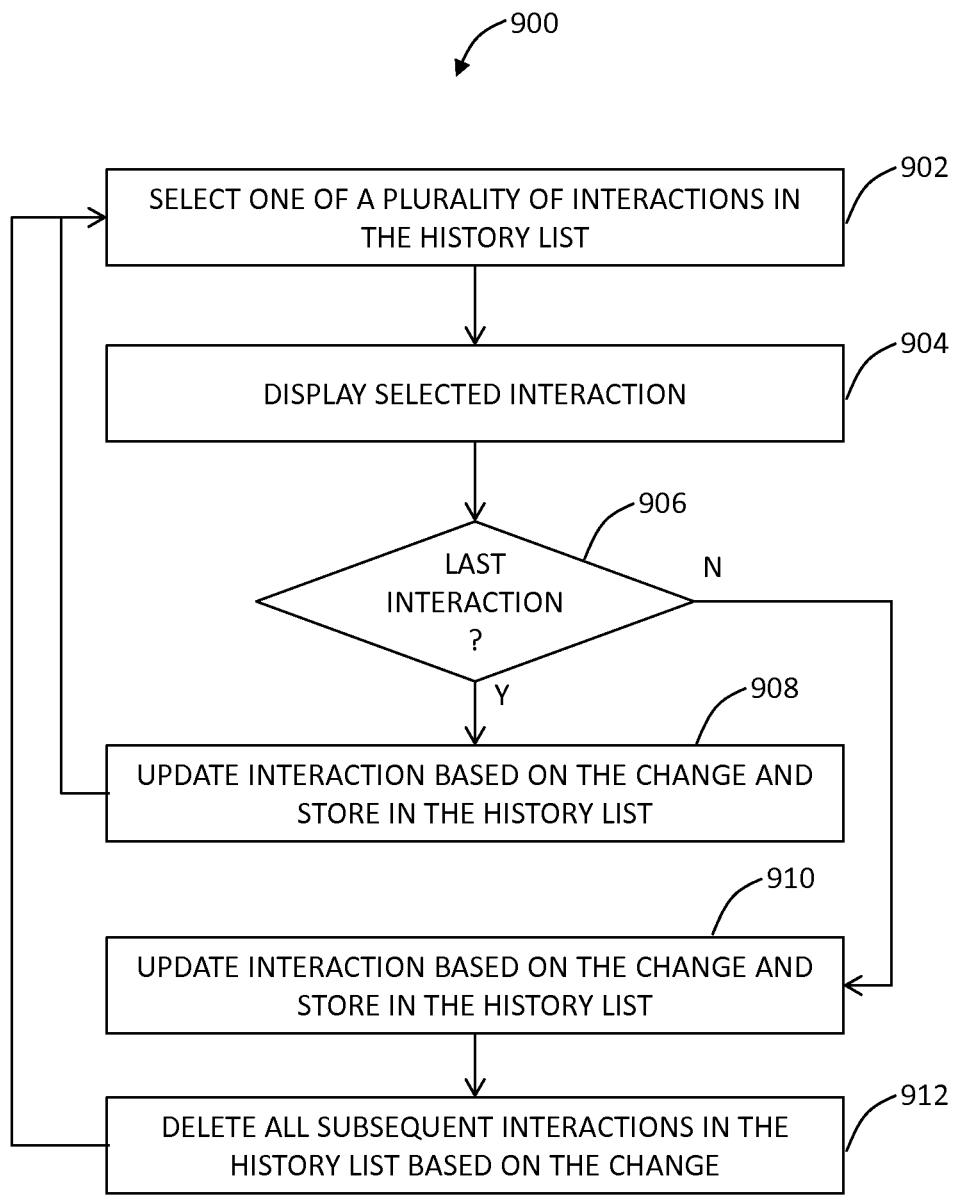
FIG. 9 is a flowchart of an interactive analytics history method that can be used in conjunction with the method of FIG. 8.

Referring to FIG. 9, in an exemplary embodiment, a flowchart illustrates an interactive analytics history method 900 that can be used in conjunction with the method 800 for interactive analytics of Internet traffic such as web browsing statistics and the like for providing various intuitive mechanisms for interaction with data visualizations. The method 900 can be implemented with the systems 100, 500, 700 and with the methods 600, 800. As described in the method 800, there is a history list of preceding interactions. The method 900 includes selecting one of a plurality of interactions in the history list (step 902). The selected interaction is displayed (step 904). That is, the user can select any previous interaction in the history list at any time. If the selected interaction is the last one in the history list (step 906), then any updates made to the selected interaction only affect it. That is, the method 900 can include updating the selected interaction based on a change and storing it again in the history list (step 908). If the selected interaction is not the last one in the history list (step 906), then any updates made to the selected interaction affect it as well as subsequent interactions in the history list. The method 900 can include updating the selected interaction based on a change and storing it again in the history list (step 910). Additionally, the method 900 can include deleting all subsequent interactions (from the selected interaction) in the history list based on the change (step 912). Thus, once a change or update is made in the middle or the beginning of the history list, all subsequent interactions can be automatically deleted.

The methods 800, 900 can be used to develop various reports for an organization such as a management report, an audit report, and a forensics report. As described herein, the organization can be a company, university, or any group. The organization includes a plurality of users which can each include a plurality of devices that access the Internet used a plurality of different mechanisms. Using the systems 100, 500 and the methods 600, 800, 900, the organization can monitor all Internet traffic of its users despite geographic differences, device and operating system differences, and the like. The management report can include high level charts that can be exported to PDF by an admin sends it to management on monthly/quarterly/yearly basis. Usually this report is fairly static, i.e. created once and not changed often. The audit report can include an export of transaction logs with applied filters. For example, an audit report can include customized columns exported and sent to appropriate stakeholders daily, weekly, monthly, etc. This could include sending human resources (HR) an audit report for select departments. The forensics report could be based on an investigation of a specific user, trend, etc. Here, the administrator begins by looking at high level trends then drilling down interactively until relevant information is obtained.

Figure 10:
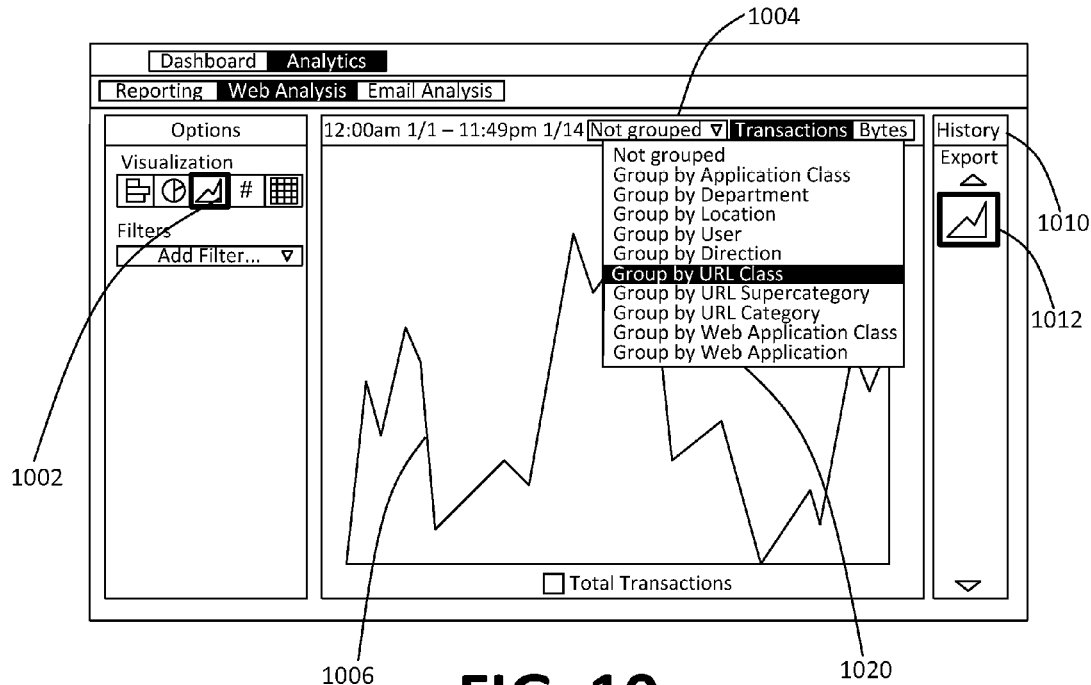
FIGS. 10-19 are screen shots presented to a user of an exemplary operation of the interactive analytics systems and methods.

Referring to FIGS. 10-19, in an exemplary embodiment, various screen shots illustrate an exemplary operation of the interactive analytics systems and methods. In particular, FIGS. 10-19 are GUI screens presented to a user of the interactive analytics systems and methods. In an exemplary embodiment, the GUI screens could be presented through a Web browser or the like. FIG. 10 illustrates a first screen shot of the exemplary operation where the user has selected a line graph visualization 1002 and no grouping 1004. As shown in a graph 1006, total transactions are shown within a date range (1/1 12:00 am-1/14 11:49 pm in this example). Since the initial grouping is "no grouping," the graph 1006 simply displays all transactions in the date range. Once this interaction, i.e. the graph 1006, is created, it is stored in a history list 1010 as a first icon 1012. FIG. 10 illustrates a pull down menu 1020 for the groupings, and in this exemplary embodiment, the user selects URL class from the pull down menu.

Figure 11:
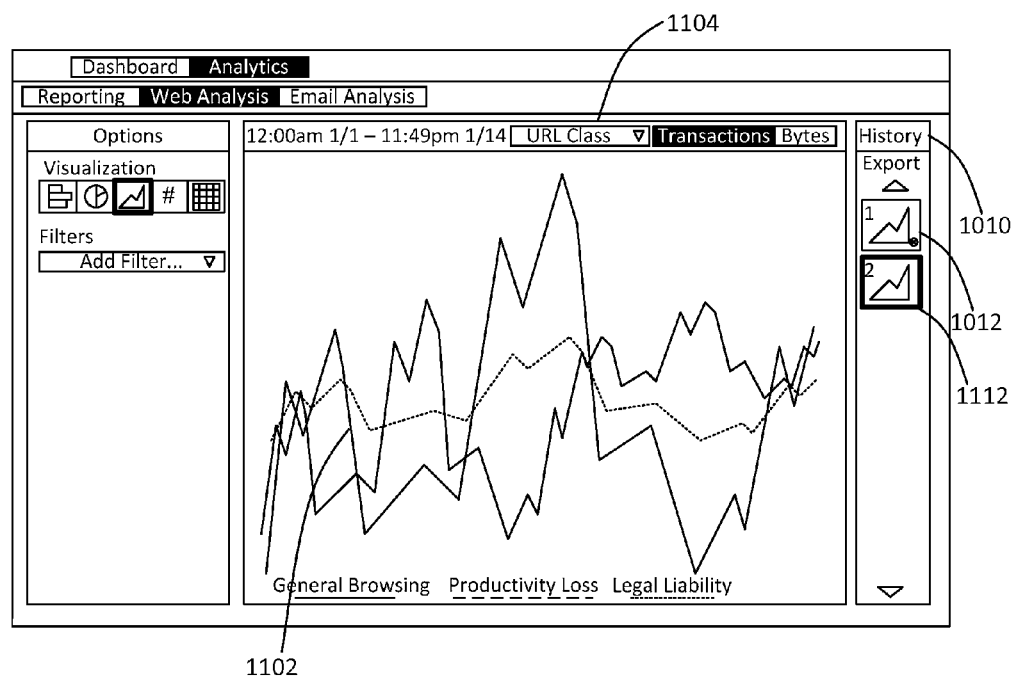
Figure 12:
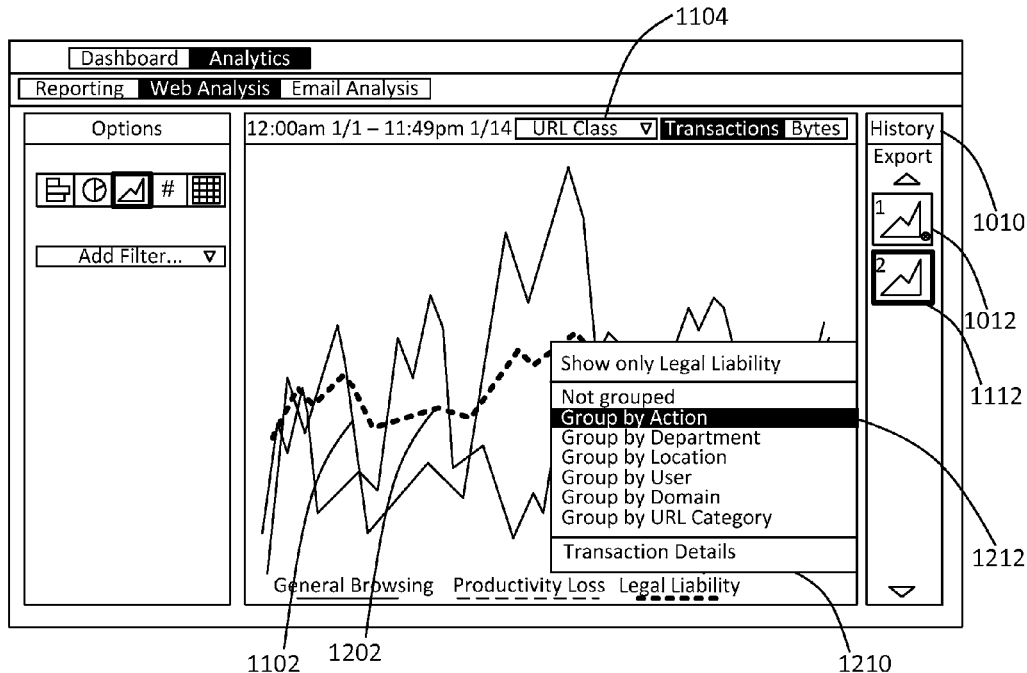
Figure 13:
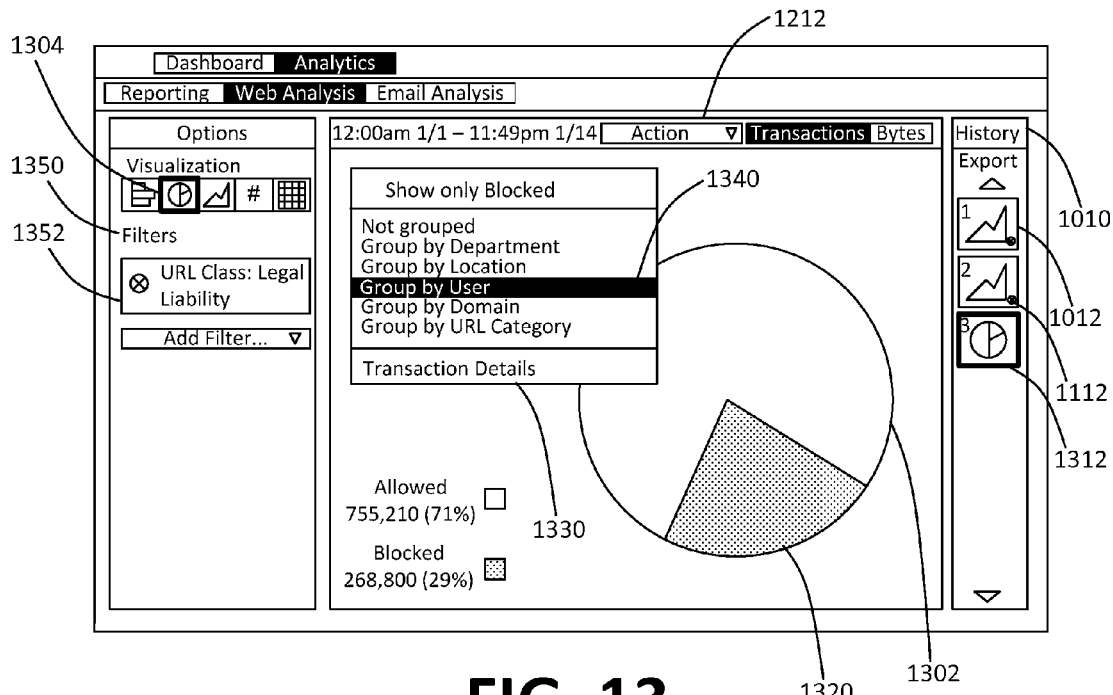

FIG. 11 illustrates a resulting graph 1102 from changing the no grouping 1004 to grouping by URL class 1104. Once the graph 1102 is created, it is added as well to the history list 1010 as a second icon 1112. The URL class 1104 shows a grouping of the transactions by different categories of URL class. For example, these can include general browsing, productivity loss, legal liability, etc. These categories are determined by the systems 100, 500 during the monitoring. In FIG. 12, the user selects the legal liability line 1202 in the graph 1102, and a menu 1210 is displayed for further grouping of the legal liability line 1202. In this example, the user selects group by action 1212. FIG. 13 illustrates this grouping of the legal liability line 1202 by action 1212 in a pie chart 1302. Note, in FIG. 13, the visualization is changed to a pie chart 1304 as the grouping by action displays a breakdown of the actions taken on the legal liability line 1202 by the system 100, 500. The action can include allowing or blocking the traffic, and in this example, the traffic was allowed 71% of the time and blocked 29% of the time. Note, the pie chart 1302 is added to the history list 1010 as a third icon 1312. Also in FIG. 13, the user is shown selecting the blocked portion 1320 of the pie chart 1302, and is presented with a menu 1330 for further grouping of the blocked portion 1320 in which the user selects group by user 1340. Filters 1350 are displayed on the side showing an applied filter 1352 of URL class by legal liability.

Figure 14:
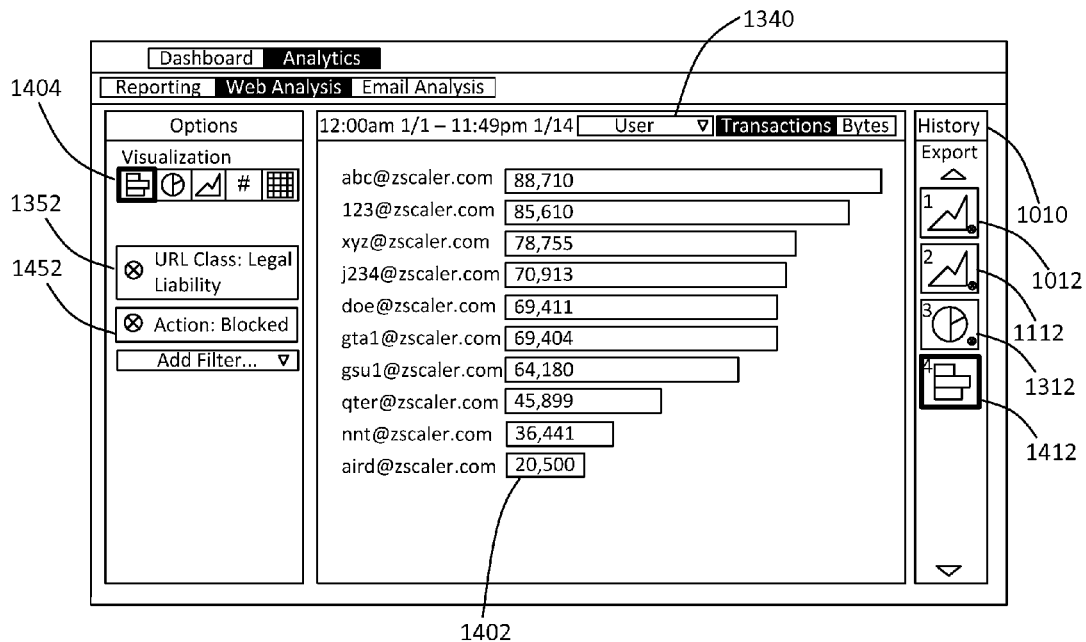
Figure 15:
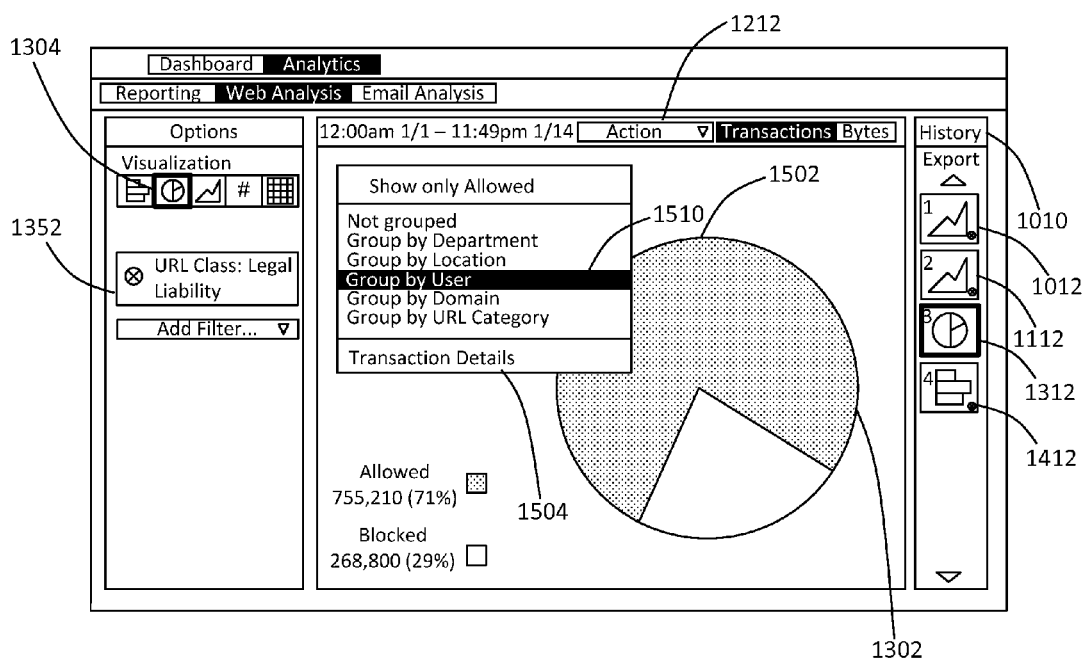
Figure 16:
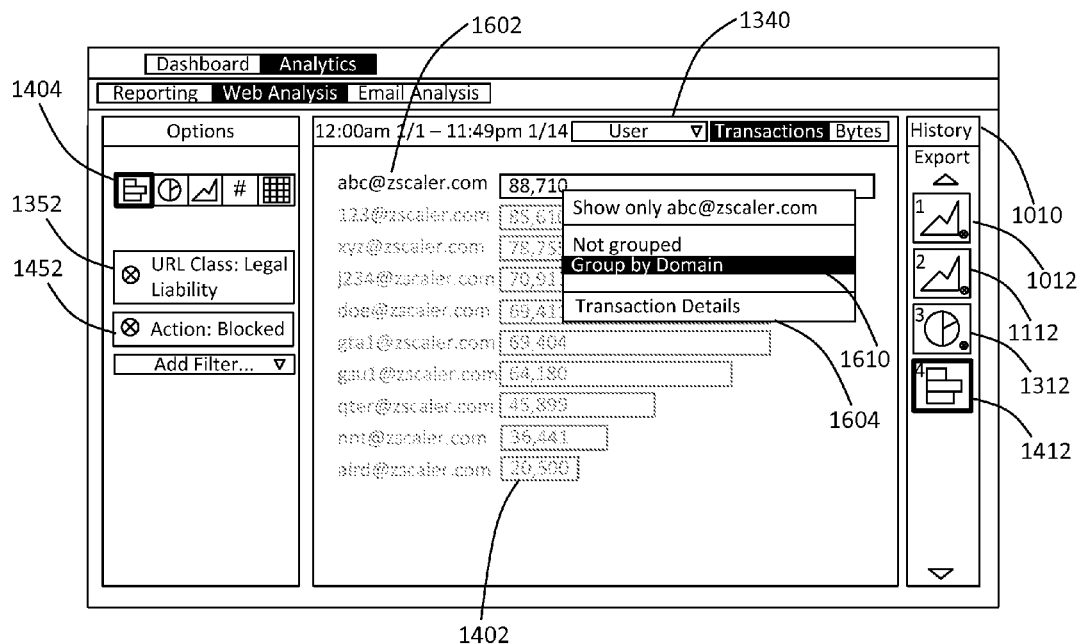

FIG. 14 illustrates the group by user 1340 of the blocked portion 1320 of the liability line 1202 in a bar chart 1402. The group by user 1340 requires bar chart visualization 1404 (or a list, table, etc.). The bar chart 1402 is added to the history list 1010 as a fourth icon 1412, and a filter 1452 is added for the blocked action. The bar chart 1402 shows transactions by user that were blocked and were legal liability in the URL class. In FIG. 15, the user selects the third icon 1312 in the history list 1010, and the pie chart 1302 is brought back up. In FIG. 15, the user now selects the allowed portion 1502 (instead of the blocked portion 1320). A grouping menu 1504 is brought up for the allowed portion 1502, and the user selects a group by user 1510. FIG. 16 refers again to the bar chart 1402 of FIG. 14. Here, a first user 1602 is selected (abc@zscaler.com), and a menu 1604 is shown and group by domain 1610 is selected.

Figure 17:
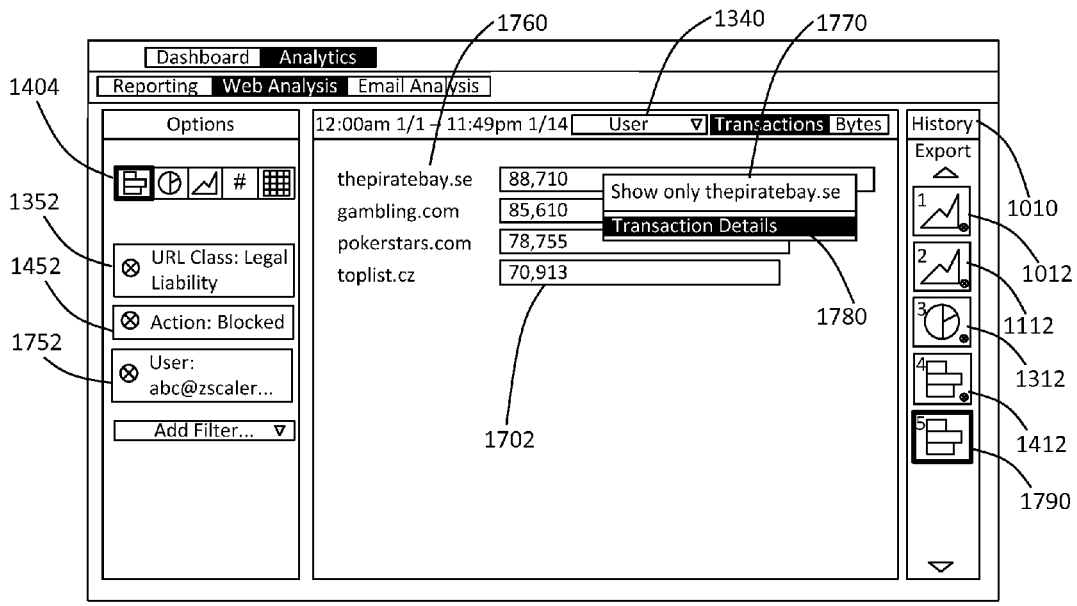
Figure 18:
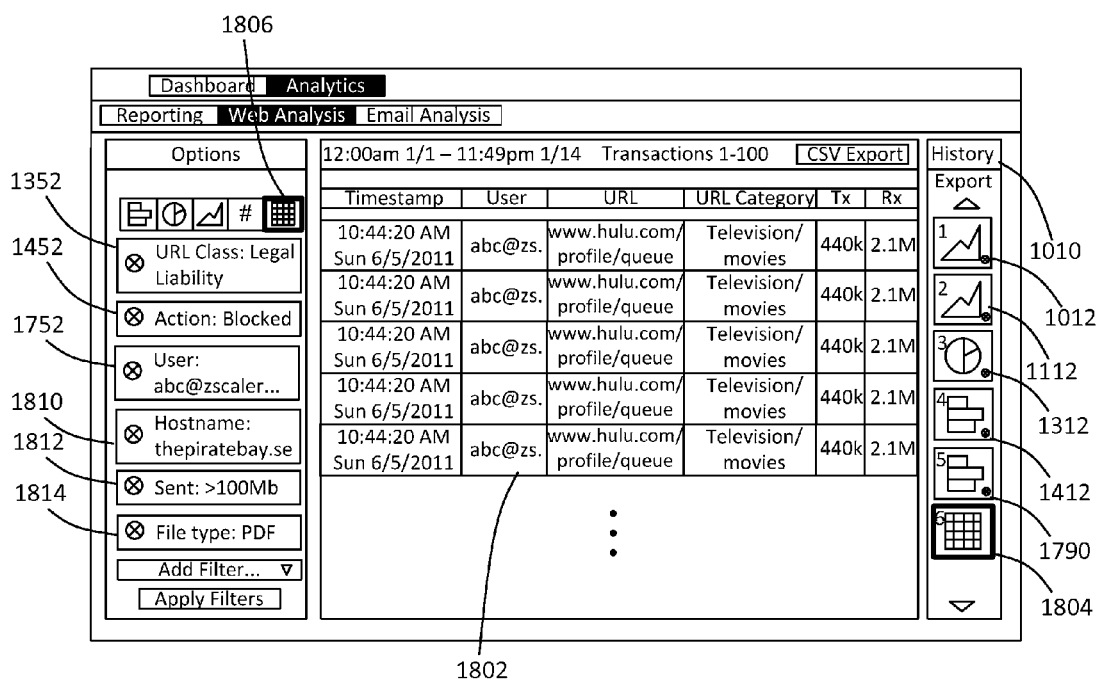
Figure 19:
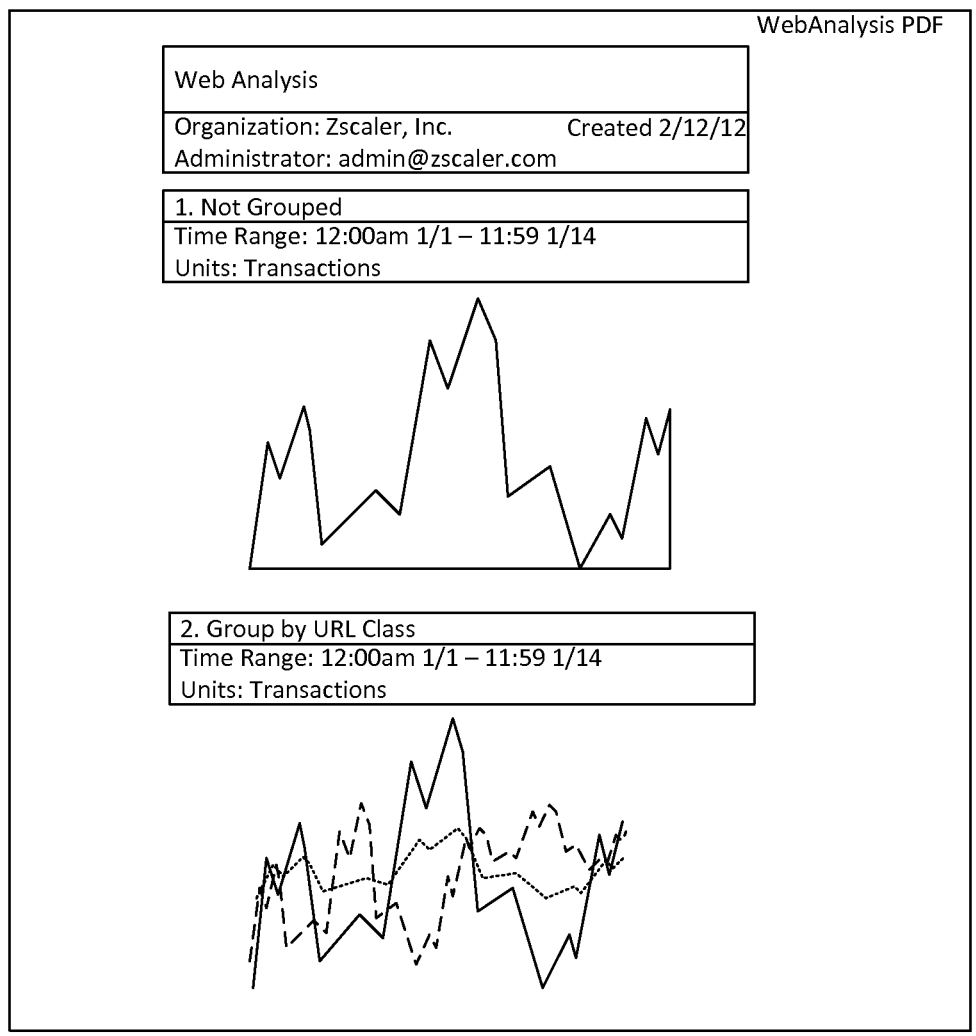

FIG. 17 illustrates a bar chart 1702 which shows domains for the user 1602. That is, block URLs that are legal liability for the user 1602 during the date range. FIG. 17 also includes a new filter 1752 for the user (abc@zscaler.com). The user selects one domain 1760 (thepiratebay.se), and a menu 1770 is shown from which the user can select transaction details 1780. Also, a fifth icon 1790 is displayed in the history list 1010 for the bar chart 1702. FIG. 18 illustrates a transactions table 1802 of the transaction details 1780 from FIG. 17. A sixth icon 1804 is included in the history list 1010, and the visualization is changed to a transaction table 1806 to display the transaction details 1780. Also, new filters 1810, 1812, 1814 are added to sort through the transaction details 1780. Here, the user is looking for transaction on the domain 1760 (thepiratebay.se) which are greater than 100 Mb and are PDF files. FIG. 19 illustrates an exemplary final report which can be produced from any of the interactions in the history list 1010.

Figure 20:
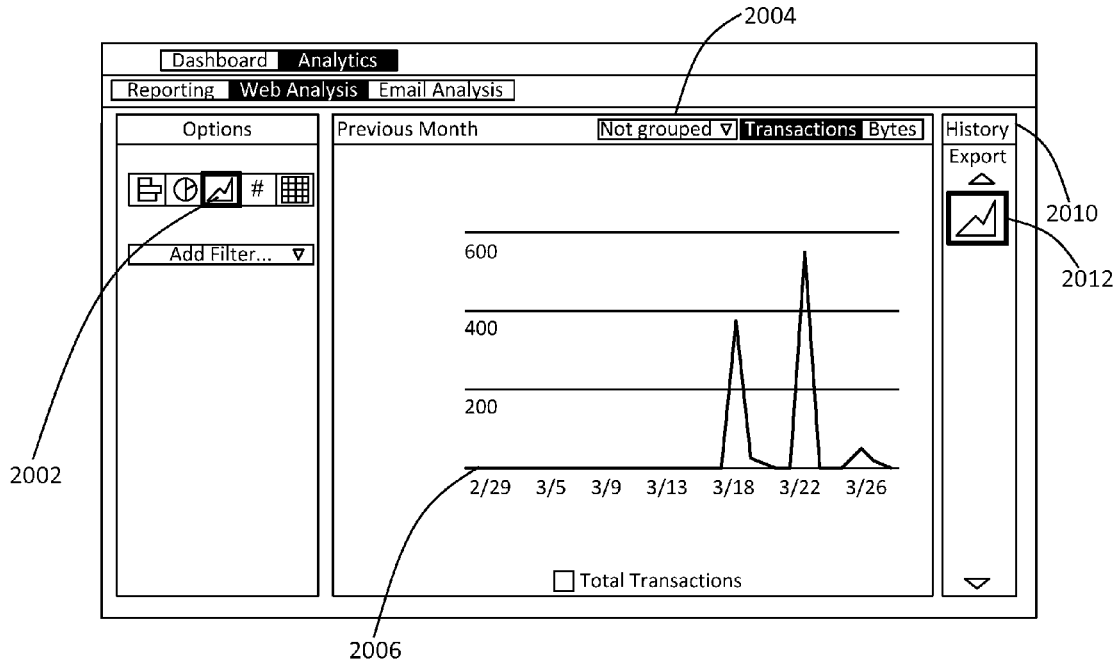
FIGS. 20-28 are screen shots presented to a user of another exemplary operation of the interactive analytics systems and methods.
Figure 21:
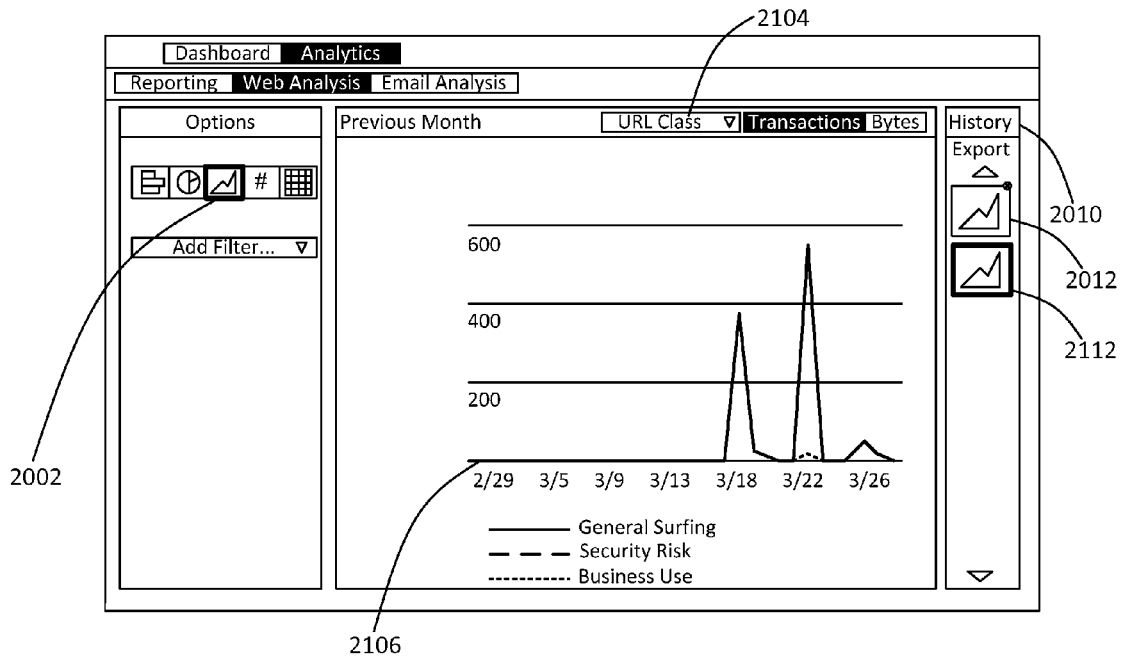

Referring to FIGS. 20-28, in an exemplary embodiment, various screen shots illustrate another exemplary operation of the interactive analytics systems and methods. In particular, FIGS. 20-28 are GUI screens presented to a user of the interactive analytics systems and methods. In an exemplary embodiment, the GUI screens could be presented through a Web browser or the like. FIG. 20 illustrates a first screen shot of the exemplary operation where the user has selected a line graph visualization 2002 and no grouping 2004. FIG. 20 is a line graph 2006 of total transactions for the previous month. FIG. 20 also includes a history list 2010 with a first icon 2012 for the line graph 2006. In FIG. 21, the grouping is changed to a grouping by URL class 2104 which separates the transactions into general surfing, security risk, and business use. FIG. 21 includes a line graph 2106 of the different URL classes, and once created, a second icon 2112 is added to the history list 2010.

Note, the definition for URL class is based on the systems 100, 500 and these definitions could also be modified, customized, etc. For example, in FIGS. 10-19, the URL classes were general browsing, legal liability, and productivity loss. In FIGS. 20-28, the URL classes are general surfing, security risk, and business use. The interactive analytics systems and methods contemplate any number of different classes as defined in the systems 100, 500. Those of ordinary skill in the art will recognize the various groupings described herein can include any number of different categories as appropriate for the systems 100, 500.

Figure 22:
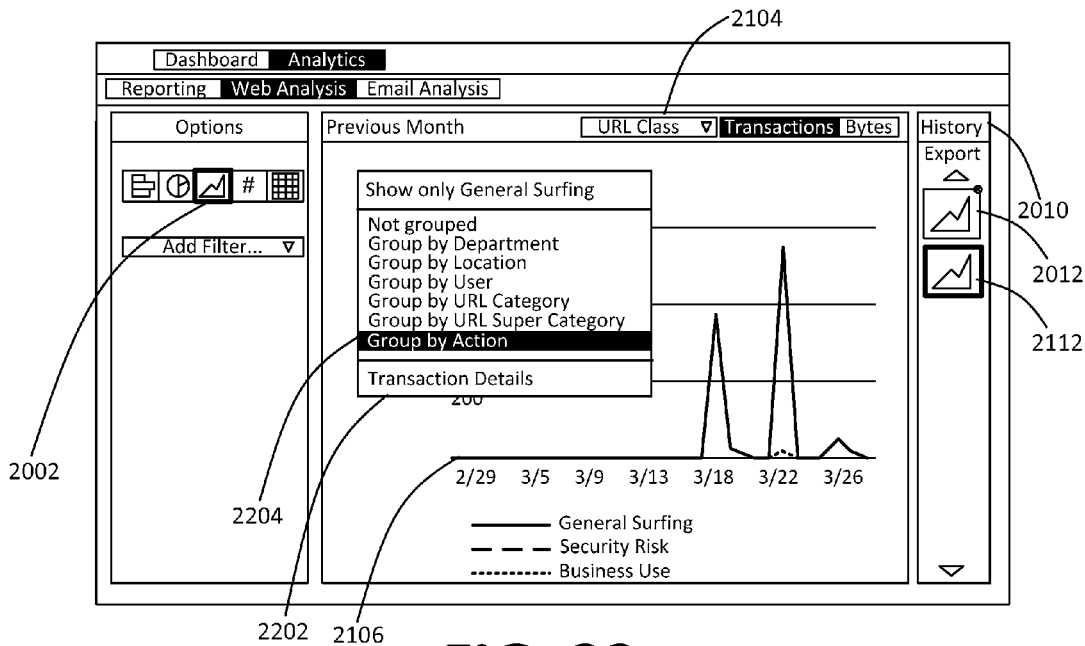
Figure 23:
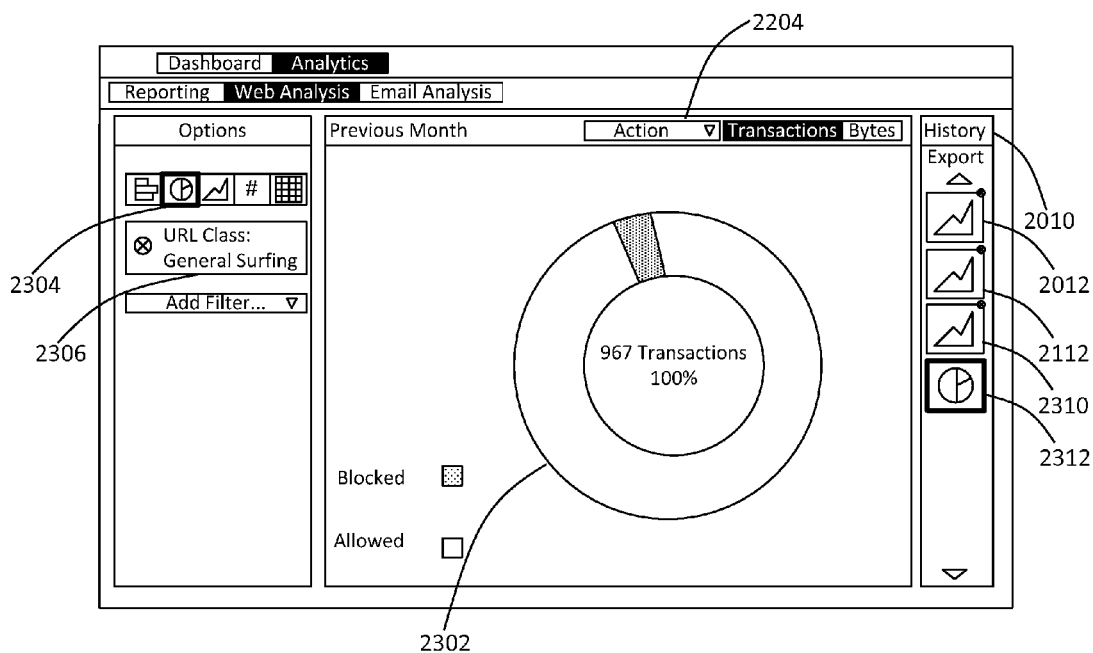
Figure 24:
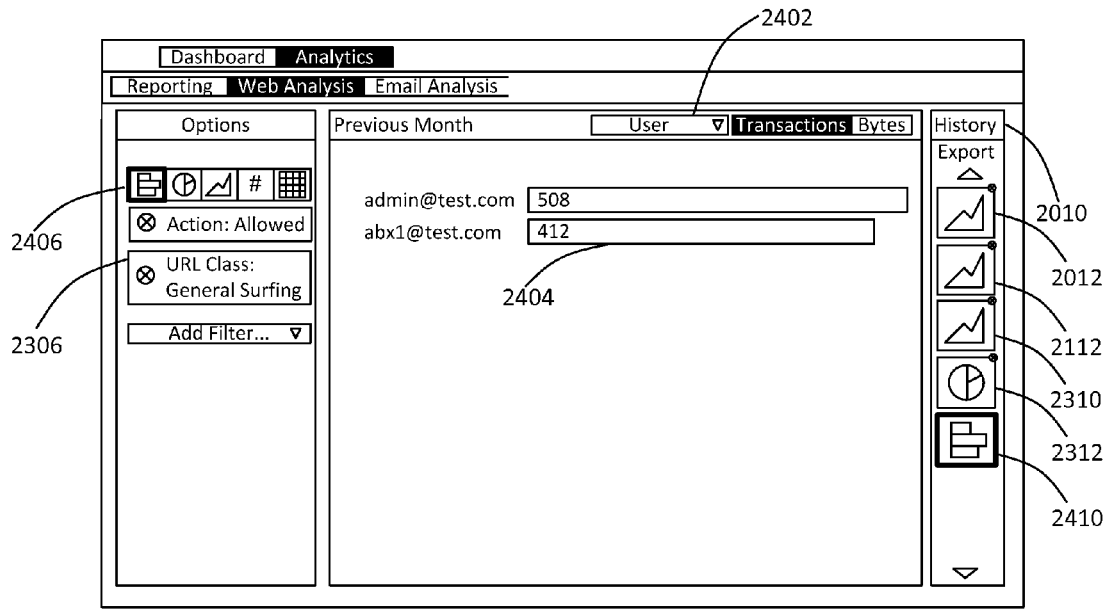

In FIG. 22, the general surfing line is selected in the line graph 2106 and a menu 2202 is shown in which a user selects grouping by action 2204. FIG. 23 shows a pie chart 2302 based on the grouping by action 2204 in FIG. 22. For the grouping by action 2204, the visualization in FIG. 23 is changed to a pie chart visualization 2304, and a filter 2306 is added for URL class: general surfing. Also, the history list 2010 now includes a third icon 2310 and a fourth icon 2312 for the previous charts. In FIG. 23, the user can select the allowed transactions for a filter and group by user 2402 which is shown in FIG. 24. FIG. 24 includes a bar chart 2404 with a bar chart visualization 2406 of allowed transactions for general surfing by user. FIG. 24 also includes another icon 2410 in the history list 2010 for the bar chart 2404.

Figure 25:
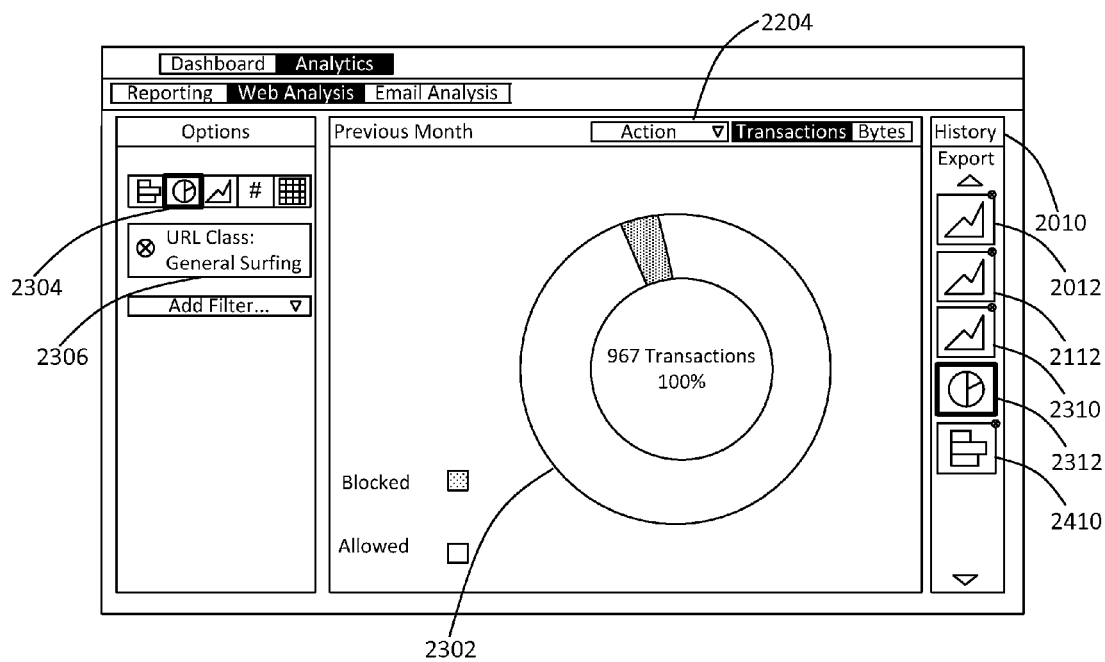
Figure 26:
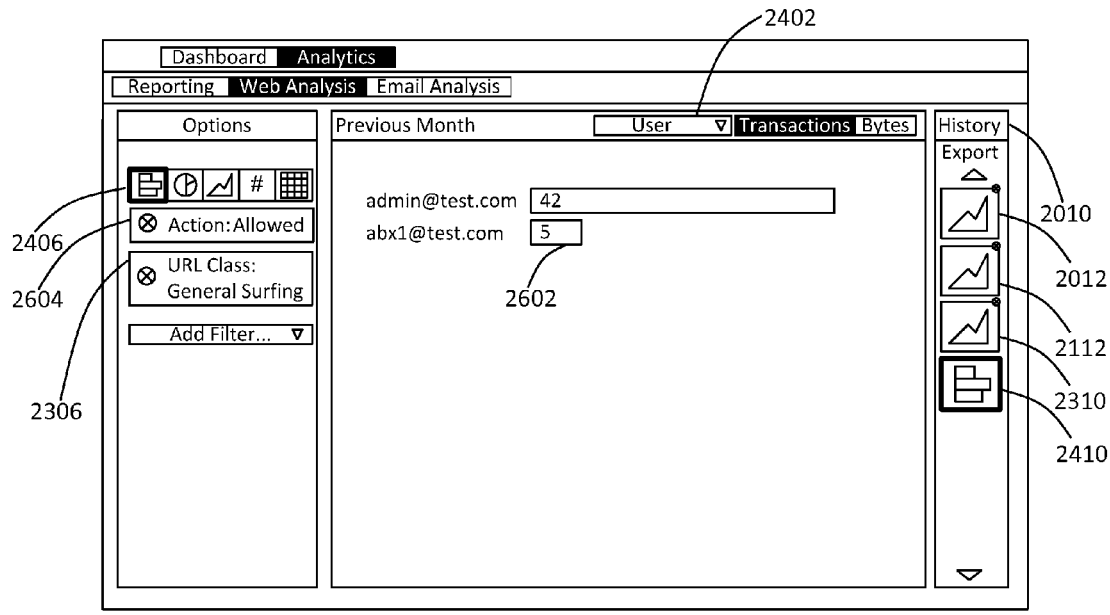
Figure 27:
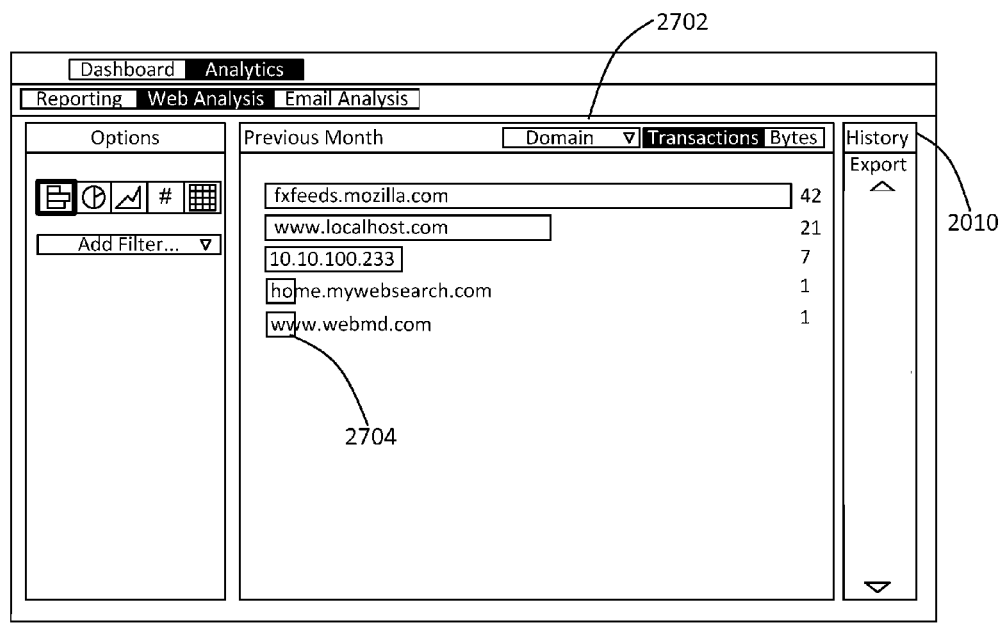
Figure 28:
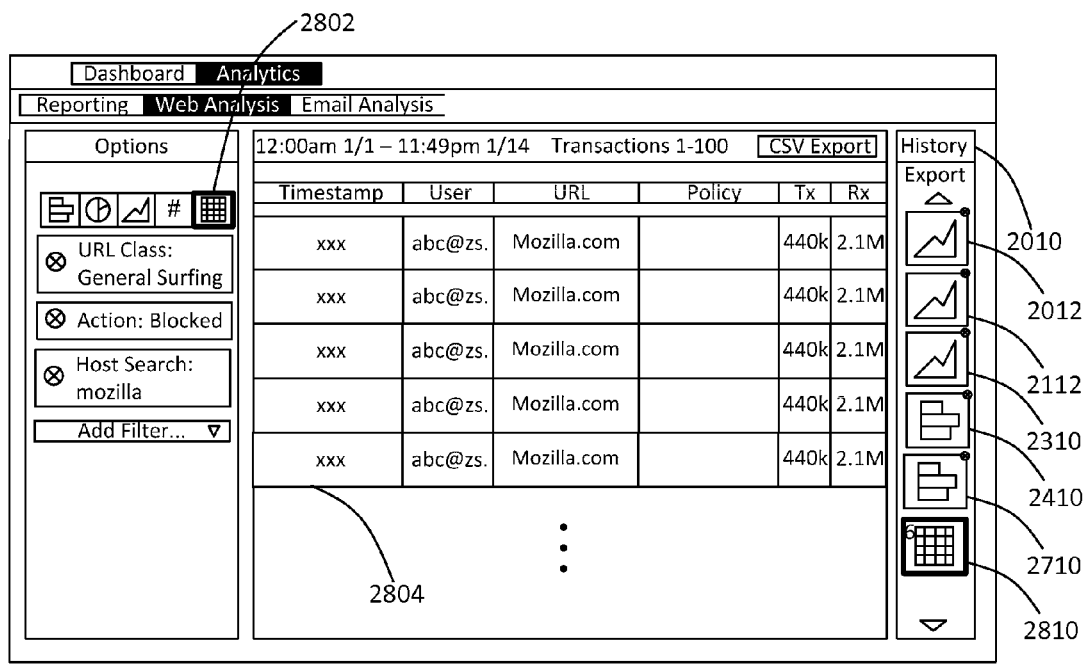

In FIG. 25, the user selects the icon 2312 in the history list 2010, and the pie chart 2302 is again displayed. The user can delete the pie chart 2302 by selecting a delete button on the icon 2312. Upon deleting the pie chart 2302, FIG. 26 illustrates the bar chart 2404 with the icon 2312 removed from the history list. Also, FIG. 26 is an updated bar chart 2602 with a filter 2604 showing allowed transactions by user. FIG. 27 shows an independent example of grouping by domain 2702 and an associated bar chart 2704. FIG. 27 includes no filters and a new icon 2710 in the history list 2010. FIG. 28 shows a new transaction table visualization 2802 of a table 2804 of transactions by users for general surfing that are blocked for a specific domain (Mozilla). Again, a new icon 2810 is added to the history list 2010 for the table 2804.

Figure 29:
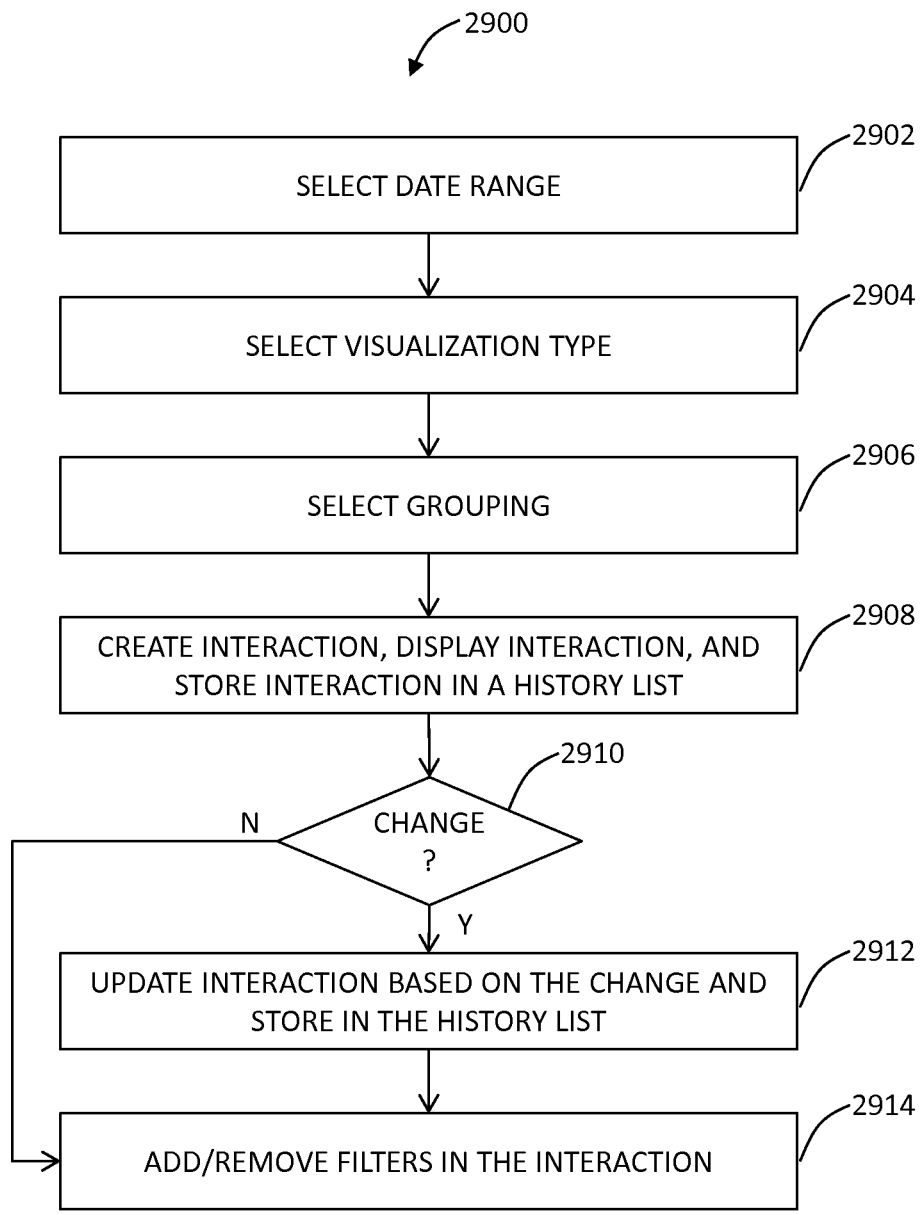
FIG. 29 is a flowchart of an interactive email analytics method.

Referring to FIG. 29, in an exemplary embodiment, a flowchart illustrates an interactive email analytics method 2900. The method 2900 can be implemented with the systems 100, 500, 700 and with the methods 600, 800, 900. For example, the system 700 can be a subset of the systems 100, 500, and the systems 100, 500 can use the method 2900 to collect data about emails. The method 2900 provides visualization of email data collected by the method 600 and stored in the logs 704 of the system 700. That is, the method 2900 can be used for forensic and/or analytic investigations to mine enormous amounts of email data in the logs 704. The steps shown in FIG. 29 for the method 2900 can be executed independently and concurrently as appropriate and in any order. The method 2900 includes selecting a date range (step 2902). The date range can include the current day, current week, current month, previous day, previous week, previous month, or any custom range at any granularity (days, hours, minutes, etc.). The method 2900 includes selecting a visualization type (step 2904). For email analytics, the visualization is a bar chart, a pie chart, a line chart, a totals lists, a summary table, and a transaction table with three view types—transaction View, Message History View, and Administrative Quarantine View.

The method 2900 includes selecting a grouping (step 2906). The email groupings can include action, direction, user, domain, department, email type, etc. With the date range, the visualization type, the data units, and the grouping selected, the method 2900 creates the interaction, displays the interaction, and stores the interaction in a history list (step 2908). Specifically, based on the selections, the method 2900 obtains the requisite data from the logs 704, i.e. based on the date, and grouping, and displays the interaction based on the visualization type. The method 2900 also stores the interaction in a history list that stores a record of the order of the user's investigation. Once created, the user can change any of the aforementioned selections (step 2910). If there is a change, the method 2900 updates the interaction based on the change and stores the updated interaction in the history list (step 2912).

Once the interaction is finalized and presented to the user, the user can modify the presentation such as adding/removing a filter in the interaction (step 2914). The filters can include email filters for direction, action, email type, etc. and email transaction filters for direction, action, email type, server response search, includes attachment, is failed delivery, spam score, message bytes, is retry, department, threat search, transaction ID search, message ID search, sender search, subject search, recipient search, destination IP, source IP, user, reason, domain, DLP dictionary, DLP engine, etc. Also, the method 900 or similar can be implemented with the method 2900 for moving up/down the history list.

The transaction view can simply show a chronological ordering of email transactions that took place. More details can be viewed for each transaction such as via clicking on a transaction and selecting data in a menu. The Message History View shows a list of emails that have been processed by the systems 100, 500 and shows a logical flow (e.g., the message was received, then it was quarantined, and finally the user released the message from quarantine. The purpose of this view is to trace an email. More details can be seen for each message and for messages that have been quarantined; the admin can take actions to release or drop the message from quarantine. The Administrative Quarantine View simply shows all messages that have been quarantined for an organization. More details can be seen for each message and the admin can take actions to release or drop a message from quarantine.

Note, the interactive analytics have been described herein with respect to Internet traffic and email traffic, but those of ordinary skill in the art will appreciate these same concepts can be applied to any type of traffic (e.g., mobile device traffic) since the same workflow concepts apply. The interactive analytics described herein have several advantages. First, due to the cloud based nature of the systems 100, 500, the interactive analytics provide monitoring independent of location, operating system, platform, etc. Thus, all users for an organization can be monitored all of the time regardless of device, method of network connectivity, etc. The interactive analytics includes a history trail of charts investigated to preserve the workflow. This allows an administrator to back to a step in the workflow and change the path of the investigation from any step in the workflow without having to start from scratch. Lastly, documenting the steps in the workflow by exporting it to PDF as this will allow the admin to share the details perhaps with IT management, or the HR department, etc.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A computer implemented interactive analytics method, comprising:
   logging data traffic between a plurality of users and an external network in a log system, wherein the logging is performed by a cloud based system;
   receiving a first request for interactive analytics of the logged data traffic, wherein the first request comprises a date range, a visualization type, and a grouping;
   obtaining data traffic from the log system responsive to the first request;
   formatting the obtained data traffic based on the date range, the visualization type, and the grouping to provide a first interaction based on the first request;
   displaying the first interaction;
   storing the first interaction in a history list;
   monitoring the data traffic between the plurality of users and the external network via the cloud based system, wherein the monitoring is independent of location, device type, and operating system of each of the plurality of users;
   receiving a plurality of additional requests for interactive analytics of the logged data traffic, obtaining data traffic from the log system responsive to the each of the plurality of additional requests, formatting the obtained data traffic to provide a plurality of additional interactions each based on the plurality of additional requests, and storing the plurality of additional interactions in the history list; and
   receiving a selection of any interaction in the history list, displaying the selection, receiving a request to modify the selection, and if the selection is not the last interaction in the history list, deleting all subsequent interactions in the history list based on the modified selection.

2. The method of claim 1, further comprising:
   monitoring Hypertext Transfer Protocol, Hypertext Transfer Protocol Secure, and email traffic associated with the plurality of users.

3. The method of claim 1, further comprising:
   compressing the monitored data traffic using a plurality of compression techniques prior to logging the data traffic in the log system.

4. The method of claim 1, further comprising:
   receiving a second request for interactive analytics of the logged data traffic, wherein the second request comprises a modification of the first request;
   obtaining data traffic from the log system responsive to the second request;
   formatting the obtained data traffic based on the modification to provide a second interaction based on the second request;
   displaying the second interaction;
   storing the second interaction in the history list.

5. The method of claim 1, further comprising:
   receiving a selection of any interaction in the history list;
   displaying the selection;
   receiving an additional request for interactive analytics of the logged data traffic, wherein the additional request comprises a modification of the selection;
   obtaining data traffic from the log system responsive to the additional request;
   formatting the obtained data traffic to provide the additional request.

6. The method of claim 1, wherein the data traffic comprises Hypertext Transfer Protocol or Hypertext Transfer Protocol Secure traffic;
   wherein the visualization type comprises one of a bar chart, a pie chart, a line chart, a totals lists, a summary table, and a table of transactions; and
   wherein the grouping comprises one of Application Class, Threat Class, Basic Threat Class, Basic Threat Type, Data Leakage Prevention (DLP) Class, DLP Dictionary, DLP Engine, Instant Message (IM) Direction, Location, Social Direction, Department, User Direction, Uniform Resource Locator (URL) Class, URL Category, URL Super-Category, Action, Web Application, Webmail Direction, and Domain.

7. The method of claim 1, wherein the data traffic comprises email traffic;
   wherein the visualization type comprises a table of transactions; and
   wherein the grouping comprises any of action, direction, user, domain, department, and email type.

8. A computer implemented interactive analytics method, comprising:
   logging data traffic between a plurality of users and an external network in a log system, wherein the logging is performed by a cloud based system;
   receiving a first request for interactive analytics of the logged data traffic, wherein the first request comprises a date range, a visualization type, and a grouping;
   obtaining data traffic from the log system responsive to the first request;
   formatting the obtained data traffic based on the date range, the visualization type, and the grouping to provide a first interaction based on the first request;
   displaying the first interaction;
   storing the first interaction in a history list;
   monitoring the data traffic between the plurality of users and the external network via the cloud based system, wherein the monitoring is independent of location, device type, and operating system of each of the plurality of users;
   receiving a plurality of additional requests for interactive analytics of the logged data traffic, obtaining data traffic from the log system responsive to the each of the plurality of additional requests, formatting the obtained data traffic to provide a plurality of additional interactions each based on the plurality of additional requests, and storing the plurality of additional interactions in the history list;
   wherein the data traffic comprises email traffic;
   wherein the visualization type comprises a table of transactions; and
   wherein the grouping comprises any of action, direction, user, domain, department, and email type.

9. The method of claim 8, further comprising:
   monitoring Hypertext Transfer Protocol, Hypertext Transfer Protocol Secure, and email traffic associated with the plurality of users.

10. The method of claim 8, further comprising:
    compressing the monitored data traffic using a plurality of compression techniques prior to logging the data traffic in the log system.

11. The method of claim 8, further comprising:
    receiving a second request for interactive analytics of the logged data traffic, wherein the second request comprises a modification of the first request;
    obtaining data traffic from the log system responsive to the second request;

formatting the obtained data traffic based on the modification to provide a second interaction based on the second request;
displaying the second interaction;
storing the second interaction in the history list.

12. The method of claim 8, further comprising:
receiving a selection of any interaction in the history list;
displaying the selection, receiving a request to modify the selection; and
if the selection is not the last interaction in the history list, deleting all subsequent interactions in the history list based on the modified selection.

13. The method of claim 8, further comprising:
receiving a selection of any interaction in the history list;
displaying the selection;
receiving an additional request for interactive analytics of the logged data traffic, wherein the additional request comprises a modification of the selection;
obtaining data traffic from the log system responsive to the additional request;
formatting the obtained data traffic to provide the additional request.

14. The method of claim 8, wherein the data traffic comprises Hypertext Transfer Protocol or Hypertext Transfer Protocol Secure traffic;
wherein the visualization type comprises one of a bar chart, a pie chart, a line chart, a totals lists, a summary table, and a table of transactions; and
wherein the grouping comprises one of Application Class, Threat Class, Basic Threat Class, Basic Threat Type, Data Leakage Prevention (DLP) Class, DLP Dictionary, DLP Engine, Instant Message (IM) Direction, Location, Social Direction, Department, User Direction, Uniform Resource Locator (URL) Class, URL Category, URL Super-Category, Action, Web Application, Webmail Direction, and Domain.

* * * * *